US009870714B2

(12) United States Patent
Potts et al.

(10) Patent No.: US 9,870,714 B2
(45) Date of Patent: *Jan. 16, 2018

(54) TABLET LEARNING APPARATUS

(71) Applicant: LeapFrog Enterprises, Inc., Emeryville, CA (US)

(72) Inventors: Alex Potts, Richmond, CA (US); Monica Brown, Berkeley, CA (US)

(73) Assignee: Leapfrog Enterprises, Inc., Emeryville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/356,038

(22) Filed: Nov. 18, 2016

(65) Prior Publication Data

US 2017/0069221 A1 Mar. 9, 2017

Related U.S. Application Data

(63) Continuation of application No. 13/615,462, filed on Sep. 13, 2012, now Pat. No. 9,501,941.

(60) Provisional application No. 61/534,737, filed on Sep. 14, 2011.

(51) Int. Cl.
G09B 17/00 (2006.01)
G09B 5/12 (2006.01)
G09B 5/02 (2006.01)

(52) U.S. Cl.
CPC ............ G09B 17/006 (2013.01); G09B 5/02 (2013.01); G09B 5/125 (2013.01)

(58) Field of Classification Search
CPC ........ G09B 17/00; G09B 17/006; G09B 5/02; G09B 5/12; G09B 5/125

USPC ......................................................... 434/169
See application file for complete search history.

(56) References Cited

U.S. PATENT DOCUMENTS

| | | |
|---|---|---|
| 2002/0168621 A1 | 11/2002 | Cook et al. |
| 2005/0210384 A1 | 9/2005 | Klassen et al. |
| 2007/0011005 A1 | 1/2007 | Morrison et al. |
| 2007/0224578 A1 | 9/2007 | De Ley et al. |
| 2007/0292826 A1 | 12/2007 | Goddy et al. |
| 2007/0298385 A1 | 12/2007 | Jenkins et al. |
| 2008/0070203 A1 | 3/2008 | Franzblau |
| 2010/0055659 A1 | 3/2010 | Rogers et al. |
| 2011/0282673 A1 | 11/2011 | Di Profio et al. |
| 2012/0141095 A1 | 6/2012 | Schwesinger et al. |
| 2012/0311438 A1 | 12/2012 | Cranfill et al. |
| 2013/0244217 A1 | 9/2013 | Potts et al. |

OTHER PUBLICATIONS

"Scrabble—Review", May 2009, retrieved from http://www.whatsoniphone.com/scrabble-review/.
U.S. Appl. No. 13/615,462, "Final Office Action", dated Aug. 10, 2015, 40 pages.

(Continued)

Primary Examiner — James Hull
Assistant Examiner — Eddy Saint-Vil
(74) Attorney, Agent, or Firm — Kilpatrick Townsend & Stockton LLP

(57) ABSTRACT

A learning apparatus can electronically provide content to a user via a display on the learning apparatus. The content can include stationary image elements and removable image elements at a plurality of locations on the display. When a user shakes the learning apparatus, the removable image elements may move away from the plurality of locations. The user can then select one or more image elements, and place them at locations on the display.

15 Claims, 32 Drawing Sheets

(56) References Cited

OTHER PUBLICATIONS

U.S. Appl. No. 13/615,462 , "Non-Final Office Action", dated Mar. 26, 2014, 30 pages.
U.S. Appl. No. 13/615,462 , "Non-Final Office Action", dated Nov. 5, 2014, 39 pages.
U.S. Appl. No. 13/615,462 , "Non-Final Office Action", dated Nov. 30, 2015, 47 pages.
U.S. Appl. No. 13/615,462 , "Notice of Allowance", dated Jul. 12, 2016, 9 pages.

TABLET LEARNING APPARATUS

CROSS-REFERENCES TO RELATED APPLICATIONS

This application is a continuation of U.S. Pat. No. 9,501,941 corresponding to U.S. patent application Ser. No. 13/615,462, entitled "Tablet Learning Apparatus," filed Sep. 13, 2012, which claims priority from and is a non-provisional application of U.S. Provisional Patent Application No. 61/534,737, entitled "Tablet Learning Apparatus," filed Sep. 14, 2011, the entire contents of which are herein incorporated by references for all purposes.

BACKGROUND OF THE INVENTION

As electronic books are becoming more prevalent, more electronic children's books are becoming available. However, these books are simply stories in electronic form. For example, these books do not allow the child to interact with the text and graphics or to receive feedback and have the story advance as the child's reading skills advance.

Embodiments of the invention address these and other problems individually and collectively.

BRIEF SUMMARY OF THE INVENTION

Embodiments of the invention are directed to a tablet learning apparatus and related systems and methods.

One embodiment of the invention is directed to a method comprising electronically providing content to a user via a display on a learning apparatus wherein the content comprises a plurality of stationary image elements and a plurality of removable image elements at a plurality of locations on the display, detecting when a user shakes the learning apparatus, wherein the removable image elements move away from the plurality of locations, receiving an indication that one or more of the image elements has been selected by a user, and determining a location of placement of the one or more image elements by the user.

Another embodiment of the invention is directed to an apparatus comprising a housing, a display screen on the housing, a processor coupled with the housing and a computer readable medium coupled to the processor. The computer readable medium comprising computer readable program code embodied therein. The computer readable program code adapted to be executed by a processor for implementing a method comprising electronically providing content to a user via a display on a learning apparatus wherein the content comprises a plurality of stationary image elements and a plurality of removable image elements at a plurality of locations on the display, detecting when a user shakes the learning apparatus, wherein the removable image elements move away from the plurality of locations, receiving an indication that one or more of the image elements has been selected by a user, and determining a location of placement of the one ore more image elements by the user.

Another embodiment of the invention is directed to a tablet apparatus comprising a housing, a display screen on the housing, a processor coupled with the housing, and a computer readable medium coupled to the processor. The computer readable medium comprising computer readable program code embodied therein. The computer readable program code adapted to be executed by a processor for implementing a method comprising providing content in an electronic book via the display screen to a user, wherein the content includes an image of an object, words, and a data input region, receiving input from the user into the data input region, and automatically modifying, by the processor, an appearance of the object after receiving the input from the user.

These and other embodiments are described in further detail below.

DETAILED DESCRIPTION OF THE INVENTION

Tablet Learning Apparatus

Figure 1:
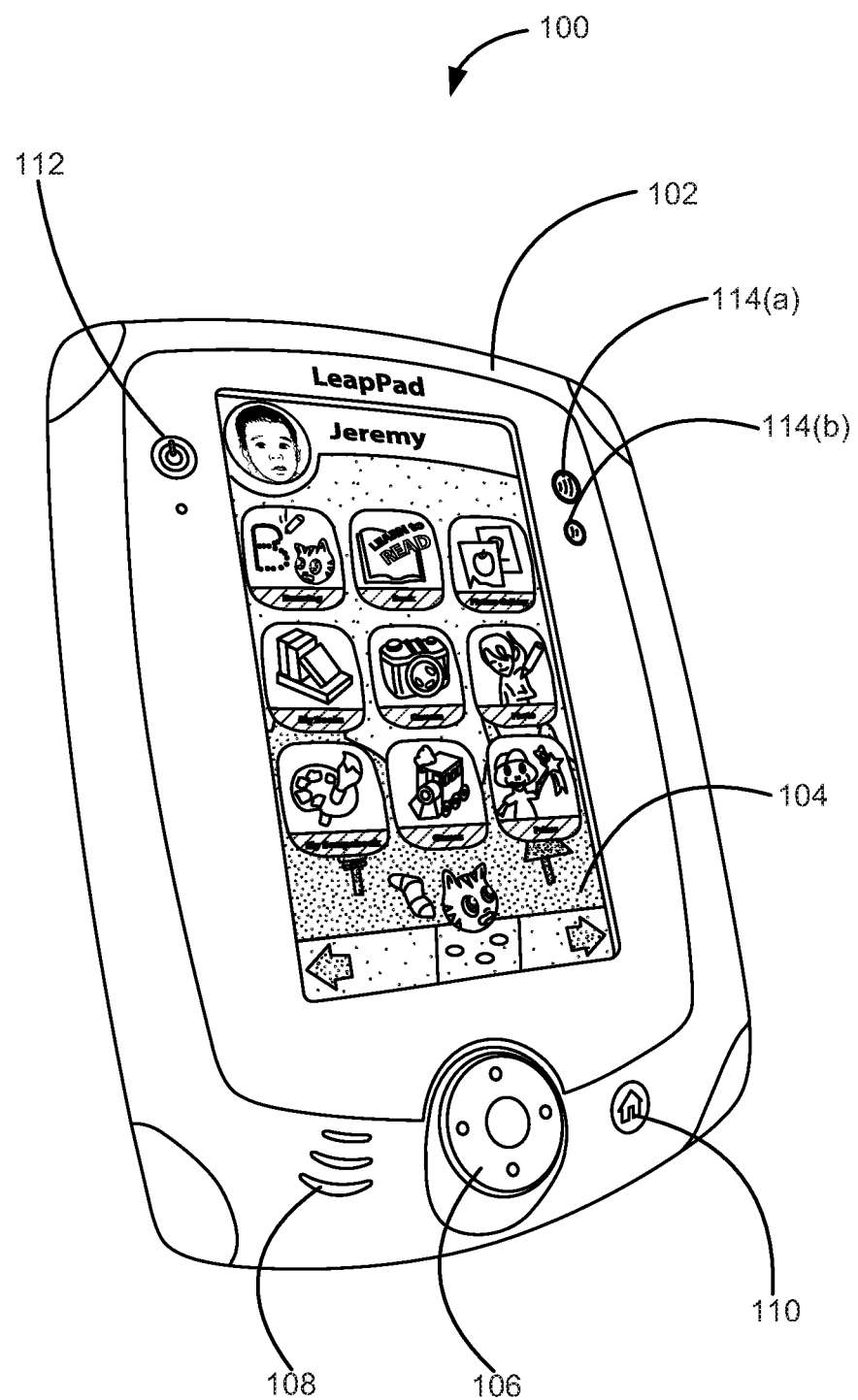
FIGS. 1-3 illustrate a tablet learning apparatus according to an embodiment of the invention.

FIG. 1 shows a perspective view of a tablet learning apparatus 100 according to an embodiment of the invention. In this embodiment, the tablet learning apparatus may include a housing 102, a display screen 104 on the housing, a directional control pad 106 on the housing 102, and an audio output device 108 such as a speaker on the housing 102. The apparatus 100 may also include one or more actions buttons such as a home button 110, a power button 112 and one or more volume buttons 114(a)-114(b) (e.g., a volume up button and a volume down button).

Figure 2:
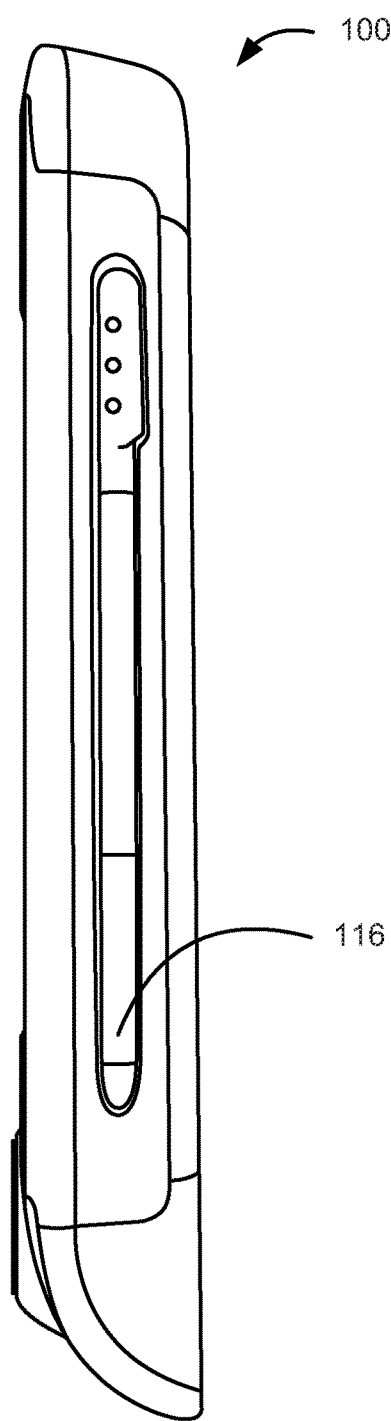
Figure 3:
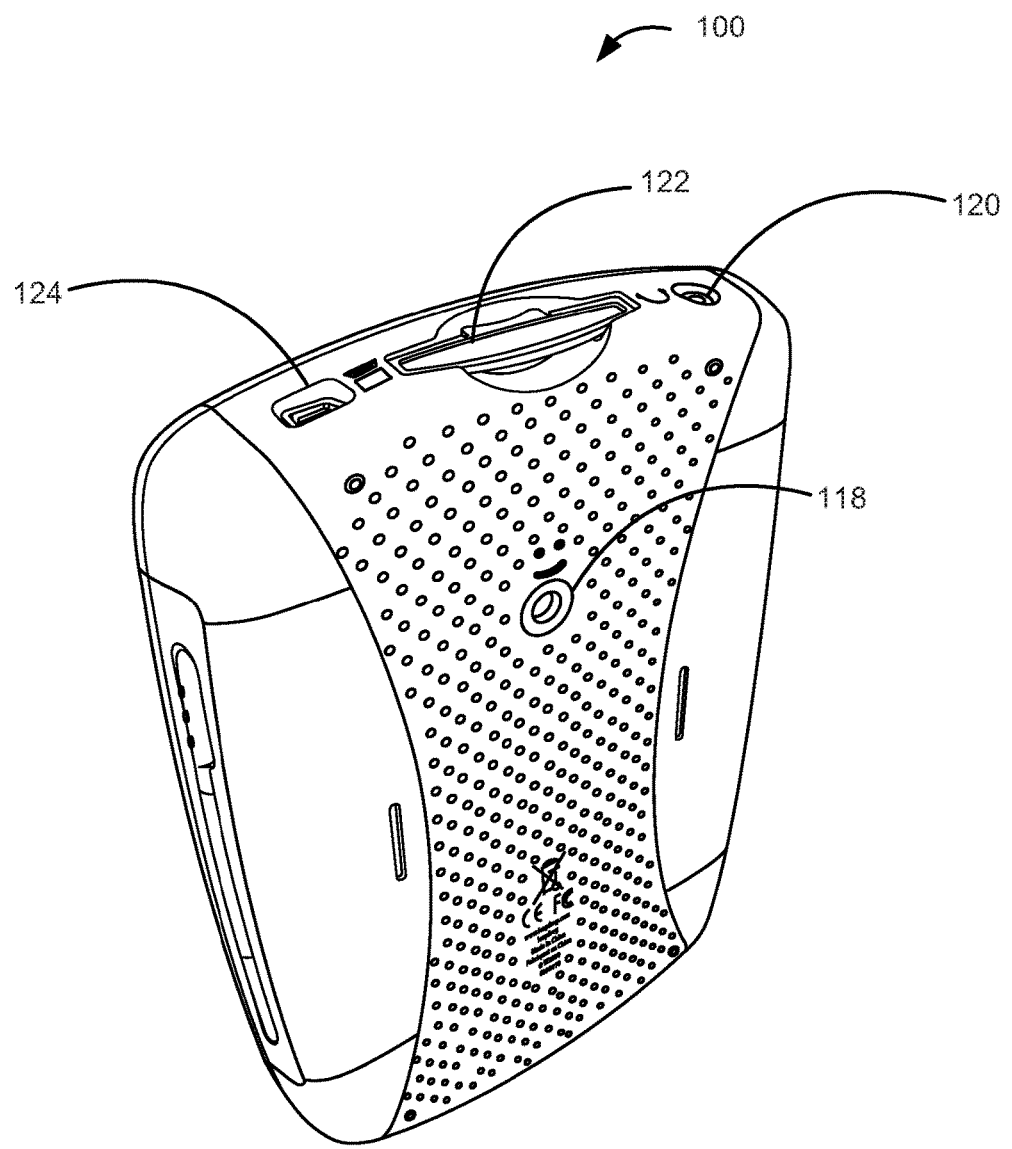

FIG. 2 shows a side view of the tablet learning apparatus 100 and a removable stylus 116. FIG. 3 shows a and back/top view of the tablet learning apparatus 100 and a camera 118, an output port 120 for an output device such as headphones, a cartridge connector 122 and an input port 124 for devices (e.g., a USB port). Preferably the device has a USB port for uploading and downloading data via a personal computer or other device.

In one embodiment, the housing 102 may be shaped so that it can be held in the hand of a small child. The housing 102 may be made of molded plastic and may be rectangular shaped with rounded corners and edges. The embodiment shown in FIG. 1 does not have a keyboard. However, one or more alpha-numeric keys could be included on the housing in an alternative embodiment. Based on the disclosure and teachings provided herein, a person of ordinary skill in the art will appreciate how to utilize various housing shapes for use in accordance with the present invention.

The display screen 104 may comprise any suitable display device. For example, suitable display screens may include, LEDs (light emitting diodes), LCDs (liquid crystal displays), etc. Appropriate driver programs and/or driver chips (e.g., LCD driver chips) can be included in the apparatus 100 to facilitate the function of the display screen 104. For example, in some embodiments, the display screen 104 may comprise an LCD screen have a screen size of 5 inches by 3.2 inches. The display screen may occupy a significant portion of the device.

The display screen 104 may also have touch-screen capability. In embodiments of the invention the display screen 104 may be a resistive or capacitive screen. In one embodiment the touch screen capability is adjusted for stylus sensitivity which allows movement of the stylus 116 on the display screen 104 to be detected.

The touch-screen capability may be achieved via an electronic position location system. The electronic position location system is capable of determining a location of a selected region of the display screen 104. A commercially available electronic position location system like the ones that are used in many commercially available devices such as personal digital assistants, tablet PCs, and smartphones, may be used. An exemplary system may comprise a glass or plastic plate with a metallic coating facing a metallic coating on an underside of a layer of Mylar™ above the glass or plastic plate. Pressing the screen with the stylus 116 brings the plate and the Mylar™ layer in contact with each other so that an electrical current flows through them. By measuring the electrical current from two sides of the display screen 104, a computer program then determines the vertical and horizontal position of the stylus 116. By sampling contact locations at a predetermined rate, such as, 100 times a second or faster, the display screen 104 can detect the position of the stylus 116. In other examples, there can be a grid of wires under the display screen 104 that can be activated after interaction with the stylus 116. The x-y position can be determined with a processor inside the apparatus 100.

The directional control pad 106 can be of the type used in commercially available handheld gaming devices. The pad 106 can be depressed to move a cursor up, down, to the left, to the right or to other predetermined directions. The directional control pad 106 allows a user to move a cursor or other image on the display screen 104 to select an image element on the display screen 104.

Action buttons can be included in the apparatus 100. For example, as shown in FIG. 1, a power button 112 may be provided to turn the apparatus 100 on and off. A "home" button 110 may be provided to allow the user to get back to a home state. For example, the "home" button 110 can bring the user back to the main menu. Also, one or more volume buttons 114(*a*)-114(*b*) may be provided to allow a user to adjust the volume of the audio on the device up or down The apparatus 100 may include a memory device comprising computer code for an educational game, electronic book, or other application program, and/or for storing computer code that relates to the operation of the apparatus 100. Based on the disclosure and teaching provided herein, various educational games, electronic books and other application programs can be played and viewed using the apparatus 100. The educational programs and another of the functions described in this application can be programmed by those or ordinary skill in the art using any suitable programming language including C, C++, Flash, etc.

The memory device may be any suitable temporary or permanent information storage device. For example, the memory device may include one or more of optical, magnetic, or electronic storage media such as optical or magnetic disks, tapes, sticks, and the like. Storage devices such as these may be used alone or in combination to make up the memory device. Any suitable number of RAM (random access memory), ROM (read only memory) and EPROM (erasable programmable memory) chips may also be included in the memory device. The memory device may also include on board memory accessed via USB, WiFi or 3G connection to computer or other device or the internet. The memory device may be internal and/or external to the housing of the apparatus 100.

Furthermore, the memory device may be or include a cartridge (e.g., a flash data cartridge), a disk, a tape, or a memory stick. Cartridges are especially desirable since they can be easily manipulated and handled by children. Any suitable amount of storage space may be provided on the memory device.

In one embodiment, as shown in FIG. 3, a cartridge (not shown) can be received by an opening 122 in the housing 102. The opening 122 includes appropriate circuitry that allows data from the cartridge to be read. The use of cartridges provides interchangeability.

Any suitable power source may be used. For example, rechargeable or non-rechargeable batteries can be used with the apparatus 100.

Figure 4:
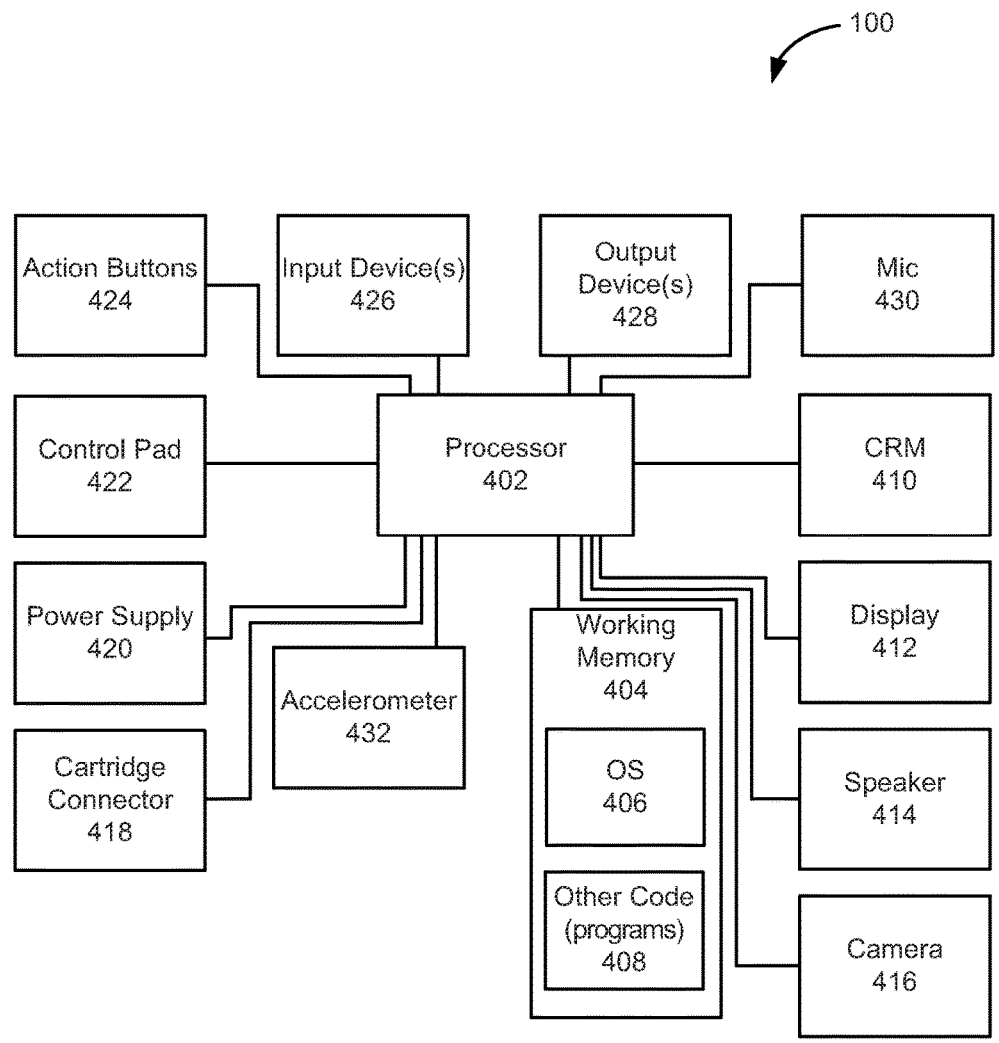
FIG. 4 is a block diagram illustrating the various components of a table learning apparatus according to an embodiment of the invention.

FIG. 4 is a block diagram illustrating the various internal components of the apparatus 100 according to an embodiment of the invention. The apparatus 100 may include a processor 402, and various components coupled with the processor, as shown. The processor 402 controls operations of the apparatus 100 and manages interactions amongst the various components.

The apparatus 100 may further include a microphone (Mic) 430, a display 412, a speaker 414, a camera 416, an accelerometer 432, a cartridge connector 418, a power supply 420, a control pad 422, one or more action buttons 424 (e.g., power button, volume button, home button, etc.), and input ports for input device(s) 426, and output ports for output devices(s) 428 (e.g., audio output devices such as headphones).

The apparatus 100 may include one or more storage devices which may include, for example, devices such as disk drives, optical storage devices, solid-state storage devices such as random access memory (RAM), and/or read-only memory (ROM), which can be programmable, flash-updatable, and/or the like. The apparatus 100 may additionally include working memory 404 which may include RAM and ROM devices. The apparatus 100 may also comprise software elements, shown as being currently located within a working memory 404, including an operating system 406 and/or other code 408, such as an application program (which may be a client application, Web browser, mid-tier application, RDBMS, etc.). It should be appreciated that alternate embodiments of an apparatus 100 may have numerous variations from that described above. For example, customized hardware might also be used and/or particular elements might be implemented in hardware, software (including portable software, such as applets), or both. Further, connection to other computing devices such as network input/output devices may be employed. Embodiments of the invention may also include WiFi or 3G access to the internet or to applications.

The apparatus 100 may include a computer readable medium (CRM) 410. The CRM 410 may be present within the apparatus 100 or may be detachable from it. The CRM 410 may represent remote, local, fixed, and/or removable storage devices plus storage media for temporarily and/or more permanently containing, storing, transmitting, and retrieving computer-readable information.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Figure 5:
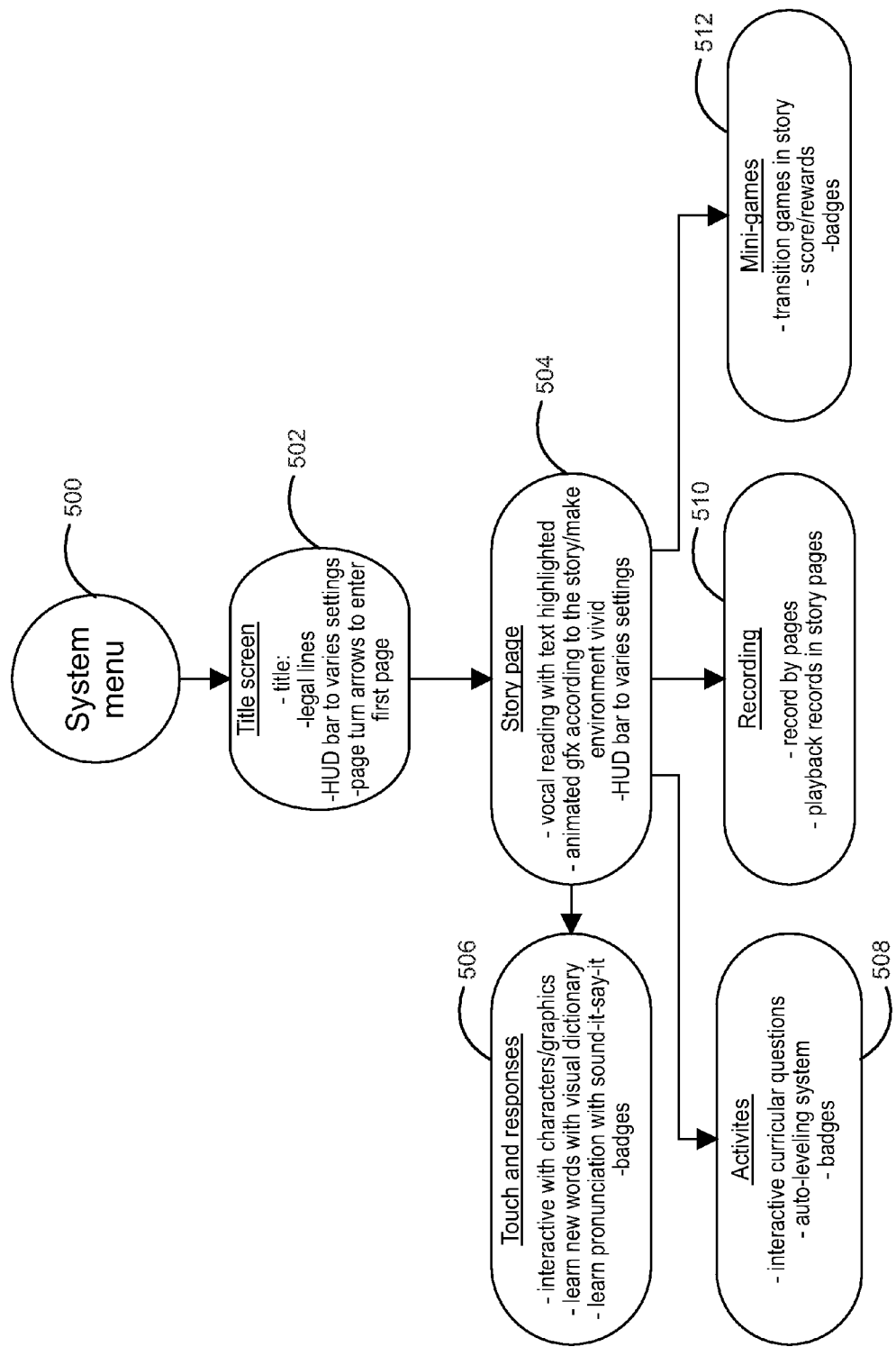
FIG. 5 is a block diagram illustrating a system menu according to an embodiment of the invention.

FIG. 5 illustrates a block diagram of an exemplary main structure of a user interface to be displayed to a user on the display screen 104 of apparatus 100. For example, after launching an application on the apparatus 100, such as an electronic book application, a screen may be displayed for the user for a few seconds with a start up logo (not shown). Next, a title screen 502 may be displayed that has the title of the book application, an author/illustrator if appropriate, a HUD bar to vary settings, and a page turn arrow to enter the first page of the book. A story page 504 may include vocal reading with text highlighted, animated graphics according to the story, and a HUD bar to vary settings. Touch and responses 506 may allow the user to interact with characters/graphics, learn new words with visual dictionary, learn pronunciations with sound-it-say-it, and include badges. Users may do activities 508 that may include interactive curricular questions, auto-leveling system, and badges. Users may record their voice by pages and have playback recorded in story pages 510. Users may play mini-games 512 which may be transition games in a story and may get scores/rewards and badges.

Creativity Applications

Embodiments of the invention provide a suite of creativity applications that combine to offer a story creation experiences all built into a single learning device. Creativity applications and tools may include an art studio, camera, video camera, microphone and gallery that can be used across applications. A user may use these tools to build his own book and put his own photo, drawing, video and audio recording into multiple "cut-outs" on each page (e.g., insert media into the page). A user may be able to create his own sentences from a drop-down text and add his own text via a QWERTY keyboard. A user may be able to also add stamps and decorations to pages and on top of page templates. The user or a parent of the user may be able to upload the book the user created to a computer and to Facebook, email, etc. Thus, the book may be shared with family and friends.

Figure 6:
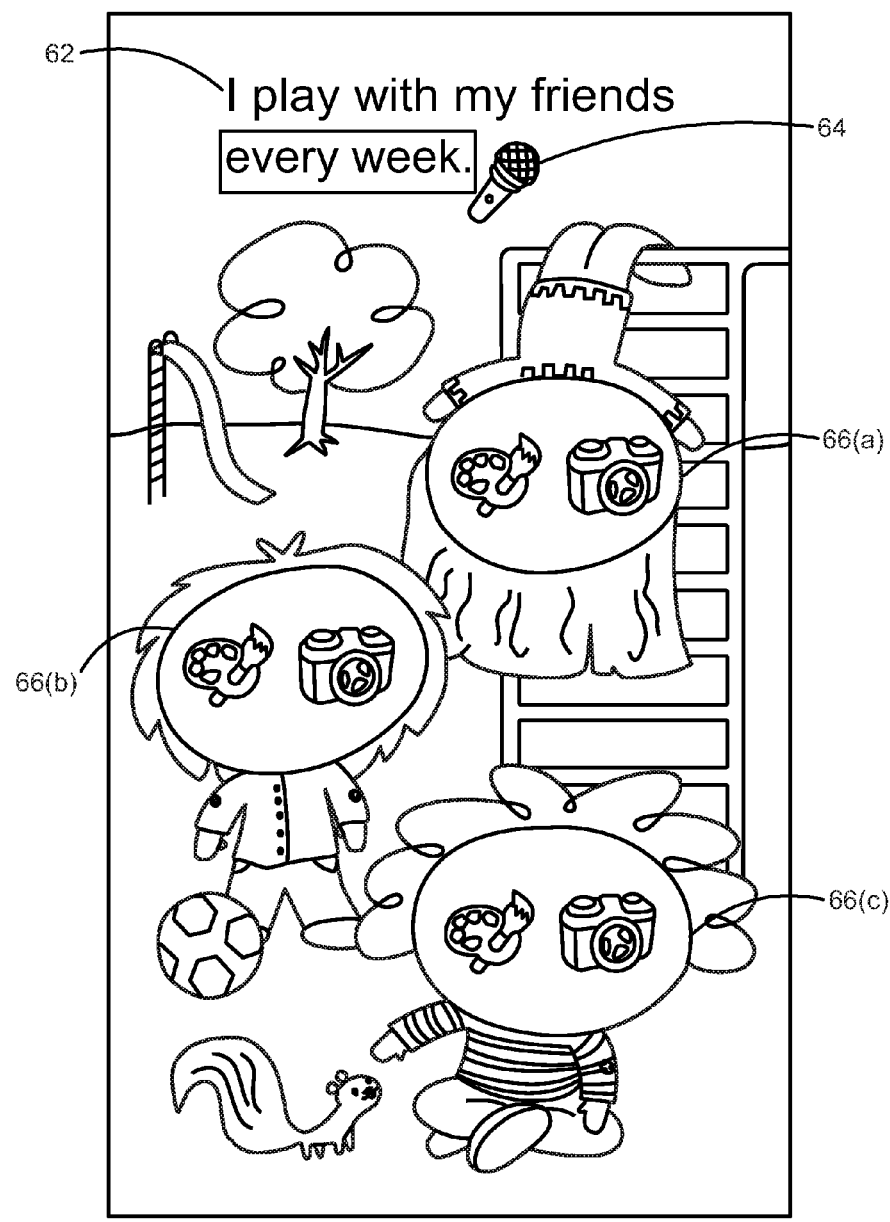
FIGS. 6-9 are exemplary screen shots of a display of a table learning apparatus according to an embodiment of the invention.
Figure 7:
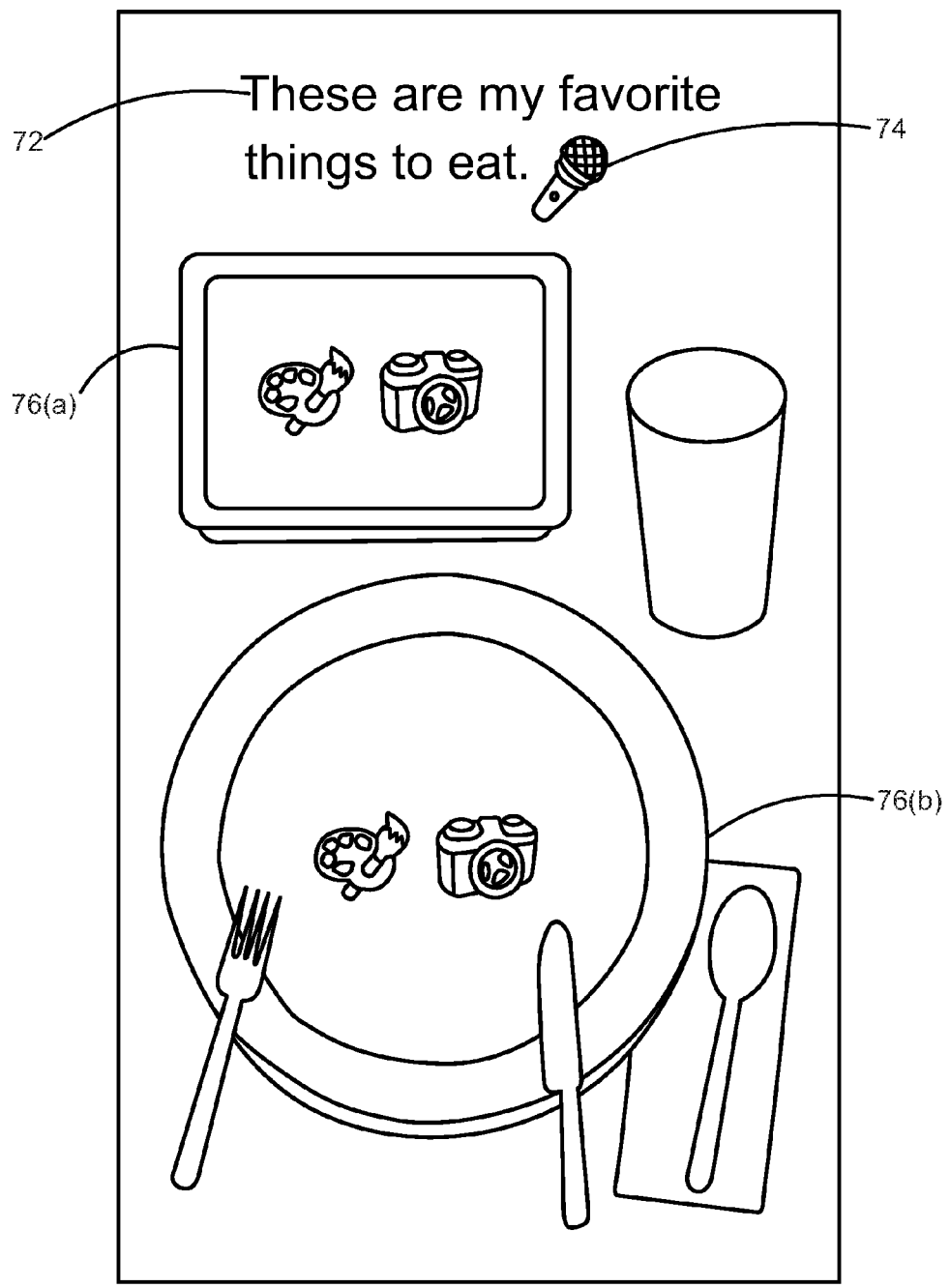
Figure 8:
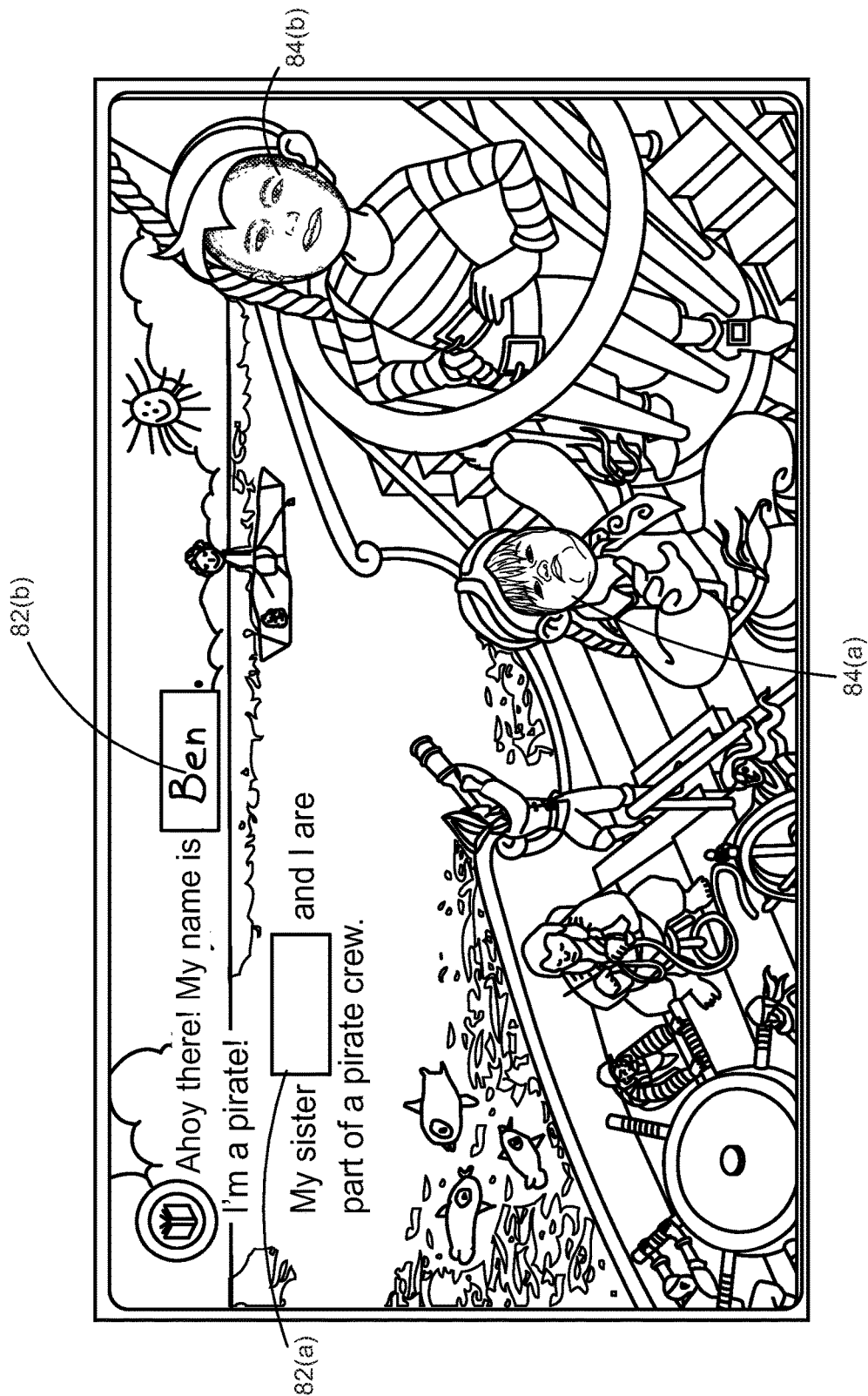

FIGS. 6-8 show screen shots of exemplary pages a user may create. Referring to FIGS. 6-7, a user may fill in text in the sentence 62 and sentence 72. The user may be able to record his voice by clicking on the microphone icon 64 and 74 at the end of the sentence. The user may be able to draw or insert a picture into each cut-out 66(a)-(c) and 76(a)-(b) on the page. Once the user draws a picture or takes a picture with the camera, the picture may be inserted into the cut-outs on the page. Referring to FIG. 8, a user may fill in the blanks 82(a)-(b) in the sentences and fill in the cut-outs 84(a)-(b) with pictures or drawings.

A number of different templates may be provided for creating the personalized stories and books. Additional templates may be available for the user to purchase. Different levels of experience may be provided for different ages and abilities. For example, the experience may be more guided for younger kids and less guided (more self-directed) for older kids. There may be fewer options for younger kids and more options for older kids. The user interface may be easy to use so that the user can use it without parent help.

Book Applications and Automatic Reading Levels

As mentioned above, a user may be able to view an electronic book application on the apparatus. In embodiments of the invention, each book application may have several different reading levels which may represent different difficulty levels (e.g., different versions of the story associated with each reading level). For example, each book may have three reading levels which represent three different difficulty levels (from easy to hard level 1 to level 3). Each reading level may have several different sublevels (e.g., reading level 1 may have sublevels 1 through 3).

Contents of the different reading levels and the display of these contents may be quite different. When a user moves to the next reading level, the text may become more complicated and the text level may increase. Smaller fonts may be used for higher levels to keep all text in a proper display area. Graphics may also differ from level to level. For example, in easier levels there may be a clear distinction between the text and illustrations, with the text on a solid background and separate from the illustration and the illustrations may support the story though a clear and comprehensible progression that stands alone in a "picture read." As the levels get more advanced, illustrations support the story but can be more complex since the reader will not depend on the illustration for comprehension. In more advanced levels, illustrations may enhance and extend the meaning of the words, but the words become the primary focus. Further, advanced levels may have illustrations that may contain "surprises" (e.g., a tiny mouse appears across pages, but is only tangentially related to the story).

Figure 9:
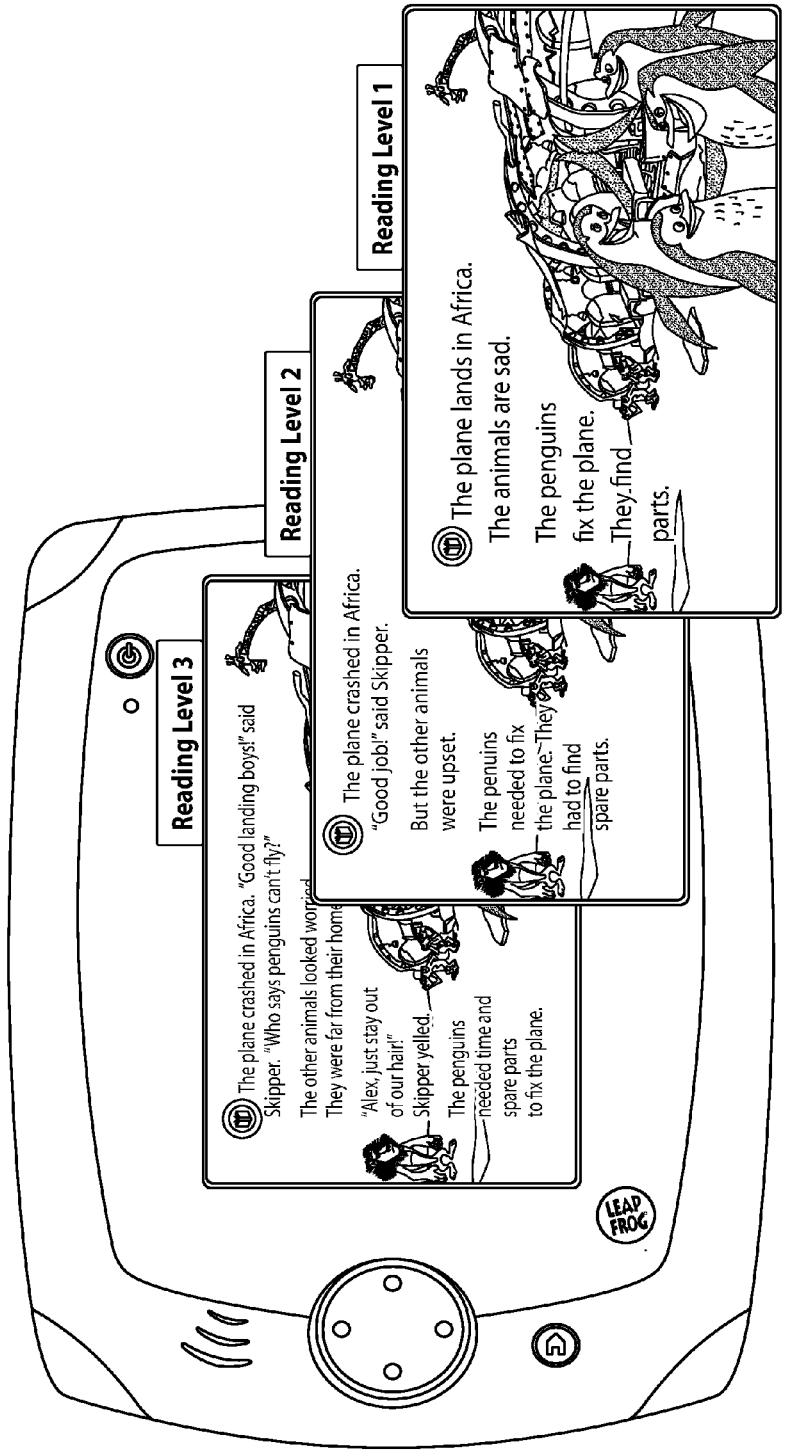

For example, a reading level 1 may have short sentence length, paragraphs of a few sentences, easy vocabulary and a font size of 18 pt. A reading level 2 may have a medium sentence length, paragraphs with a medium amount of sentences, easy and medium vocabulary, and a font size of 16 pt. A reading level 3 may have long sentence lengths, many sentences in a paragraph, easy, medium and hard vocabulary, and a font size of 14 pt. Exemplary screen shots of different reading levels are shown in FIG. 9. More details for exemplary reading levels are included in the following table:

| FEATURES | LEVEL 1 | LEVEL 2 | LEVEL 3 | LEVEL 4 |
| --- | --- | --- | --- | --- |
| LEXILE LEVEL | 0-99 | 100-249 | 250-399 | 400-600+ |
| WORDS PER SENTENCE | ≈1-5 | ≈1-8 | ≈1-10 | ≈1-15 |
| WORDS PER SPREAD | ≈25 | ≈40 | ≈60 | ≈75 |
| TOTAL WORDS | 200+ | ≈Each level may have at least a 25% increase in total words | | |

-continued

| FEATURES | LEVEL 1 | LEVEL 2 | LEVEL 3 | LEVEL 4 |
|---|---|---|---|---|
| Decodable words/sight words ratio | 90% decodable | 80% decodable | 60% decodable | 40% decodable |
| % OF WORDS WITH 1 SYLLABLE | 90% or more | 75% or more | 50% or more | 25% or more |
| CONTRACTIONS | Avoid | OK on occasion | OK on occasion | OK |
| PAST TENSE | OK | OK | OK | OK |
| Adjectives, Adverbs | OK | OK | OK | OK |
| POSSESSIVE | Occasionally | Occasionally | OK | OK |
| Commas per sentence | Avoid | 1-2 | Up to 3 | Up to 3 |
| COMPOUND SUBJECTS Scout and Violet play tag every afternoon. | Avoid | OK | OK | OK |
| Compound verbs Scout goes to the park and plays fetch every day. | Avoid | OK if simple | OK | OK |
| Compound sentences (2 independent clauses) Scout played fetch, and Violet dug a hole. | Avoid | Generally avoid | OK if simple | OK |
| Complex sentences Scout brought Violet a biscuit after she helped him find his ball. | Avoid | Generally avoid | OK if simple | OK |
| SENTENCE WRAP SENTENCE WRAPS TO NEXT LINE | Generally avoid | Generally avoid | Once per sentence | Once per sentence |

In an embodiment of the invention a user may launch a book application (e.g., engage an icon on the display screen of the apparatus by tapping his finger on the icon or using a stylus to tap the icon). When the book application is launched, a cover page may be displayed on the display screen with information associated with the book such as the title, author, illustrator, an animating graphic, and an audio announcement of the book. There may be several reading modes such as a mode to have the entire story read to the user, a mode to have each page read to the user, or a mode to allow the user to read the story on his own. The user may also be able to record himself reading the story, play games related to the story (e.g., story games or curricular games), paint, and adjust settings (e.g., reading level, exit, text highlights off/on, zoom, tutor, brightness, etc.). The user may tap a word to trigger a say it-sound it sequence. If the tapped word is a decodable word (i.e., word that can be sounded out), letters highlight as the word is sounded out. If the word is a sight word (i.e., words with irregular spelling patterns that cannot be sounded out and need to be memorized), it may be explained that some words are not so easy to sound out and these words are good to remember as a whole word.

A profile may be associated with the user that contains information about the user (e.g., name, age, grade, etc.). The user's grade in his profile may be used to set the initial reading level when he visits a book application for the first time. For example, a user that is PreK (pre-kindergarten) may be set to a reading level 1, a user in kindergarten may be set to a reading level 2 and a first grader may be set to a reading level 3.

After the user takes part in activities, an auto-leveling system may be activated. A level recommendation may be based on algorithm factoring vocabulary activity score and comprehension activity score. For example, factors that may determine a reading level may include accuracy and speed of responses to activities, percent decodable words and sight words, percent multi-syllabic words, number of words per sentence, sentences per page, font size and placement, language/sentence structure, familiarity of content, vocabulary, etc.

The reading level for the user may be stored on the device as the user's global reading level (e.g., as a global variable for the profile which new titles access when first played). Then a suggested level from the auto-leveling may be used as a default reading level every time the user enters the book application again. According to the user's performance in an activity, he may level up or level down. For example, if the user levels down (e.g., from level 3 to level 2), the lower level will be stored and used automatically the next time a book application is opened. If the user levels up (e.g., from level 1 to level 2), the higher level will be stored and used automatically the next time a book application is opened. If the user levels up, the change may be announced by a pop-up or voice to provide encouragement to the user. A user may also have the option to manually change the reading level of a book while he is reading the book. In one embodiment of the invention, this will only effect the reading level of the current book the user is reading and will not be saved. Thus, if the user exits the book and re-enters into the same or a different book application, the suggested level will be used (and not the level manually used the previous time). A user's associated reading level may be applied across the book application library to every book application the child accesses.

Figure 10:
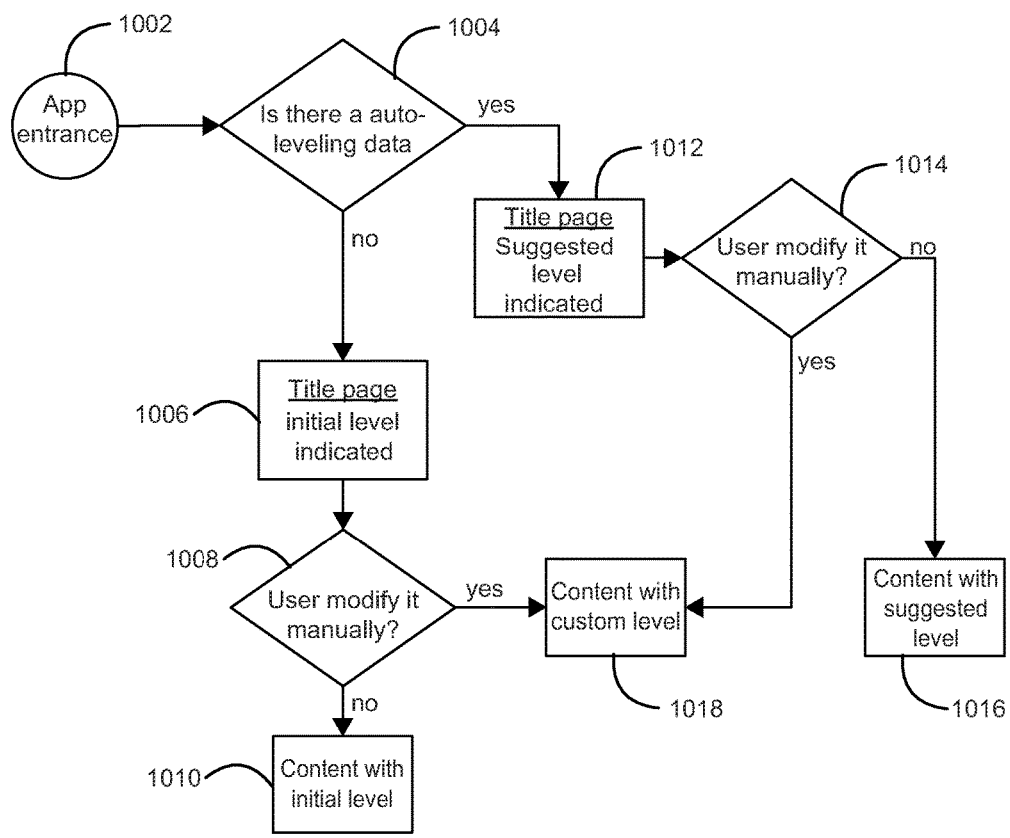
FIG. 10 is a flow chart of auto-leveling according to an embodiment of the invention.
Figure 11A:
FIGS. 11(a)-11(e) are exemplary screen shots of a display of a tablet learning apparatus according to an embodiment of the invention.
Figure 11B:
Figure 11C:
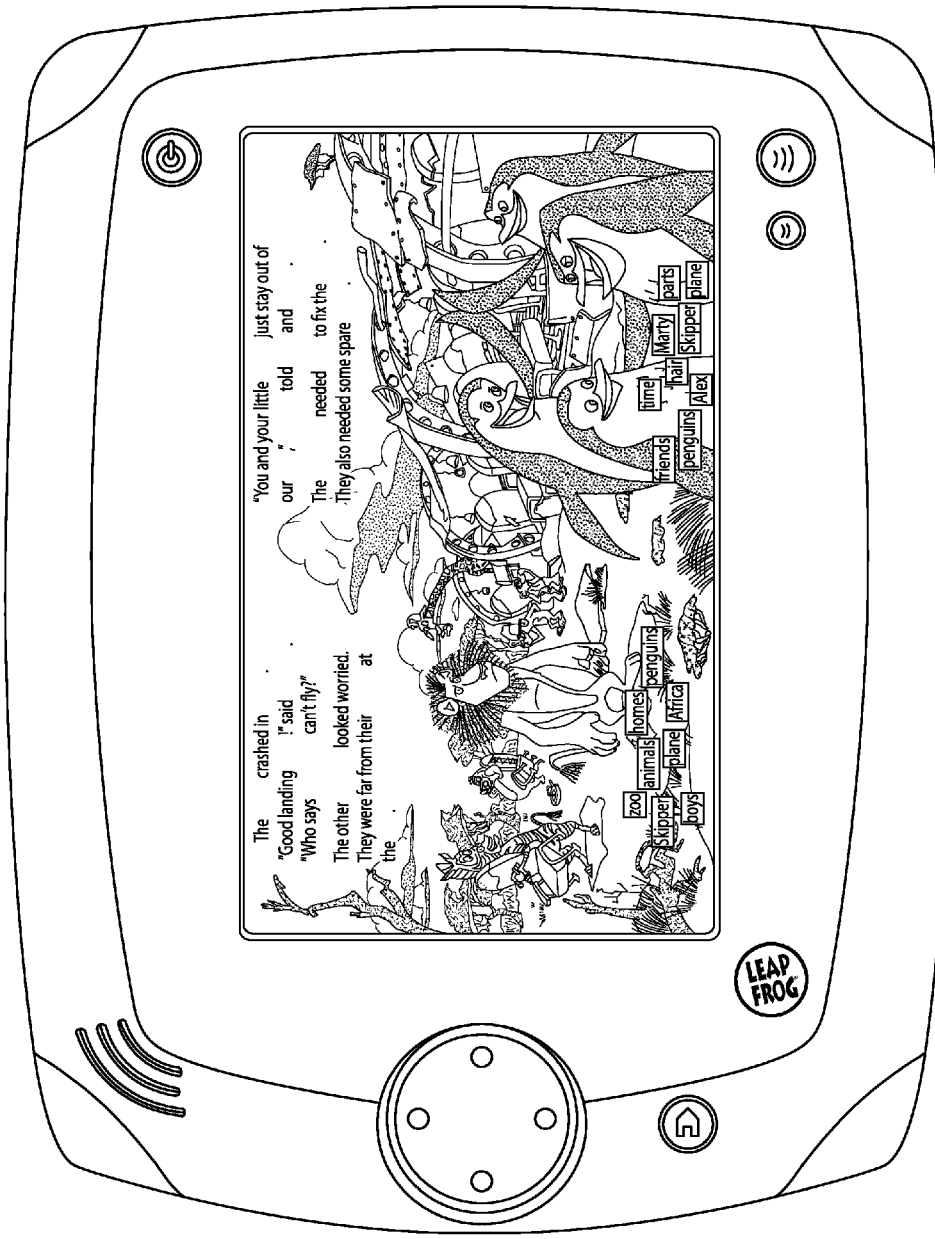
Figure 11D:
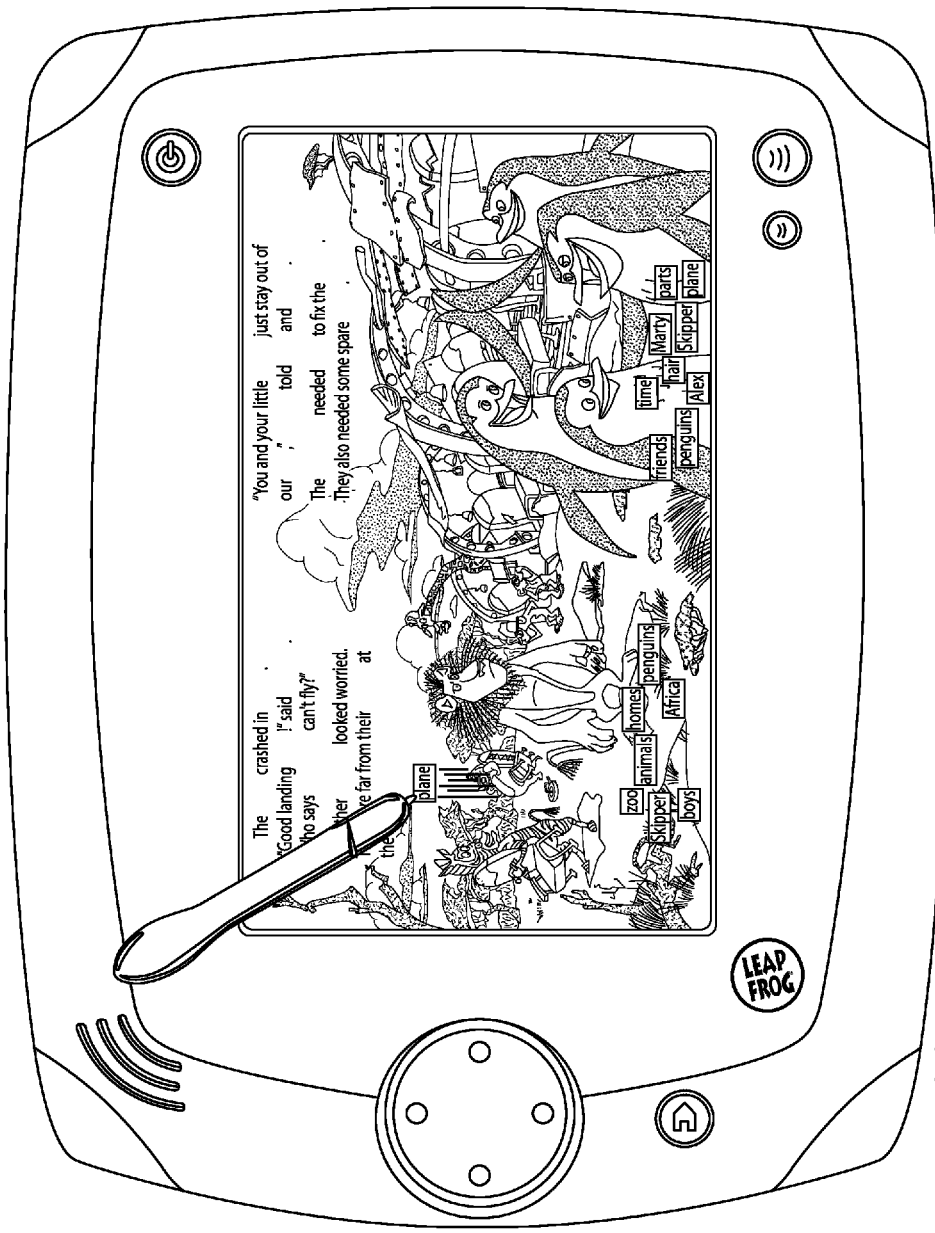
Figure 11E:
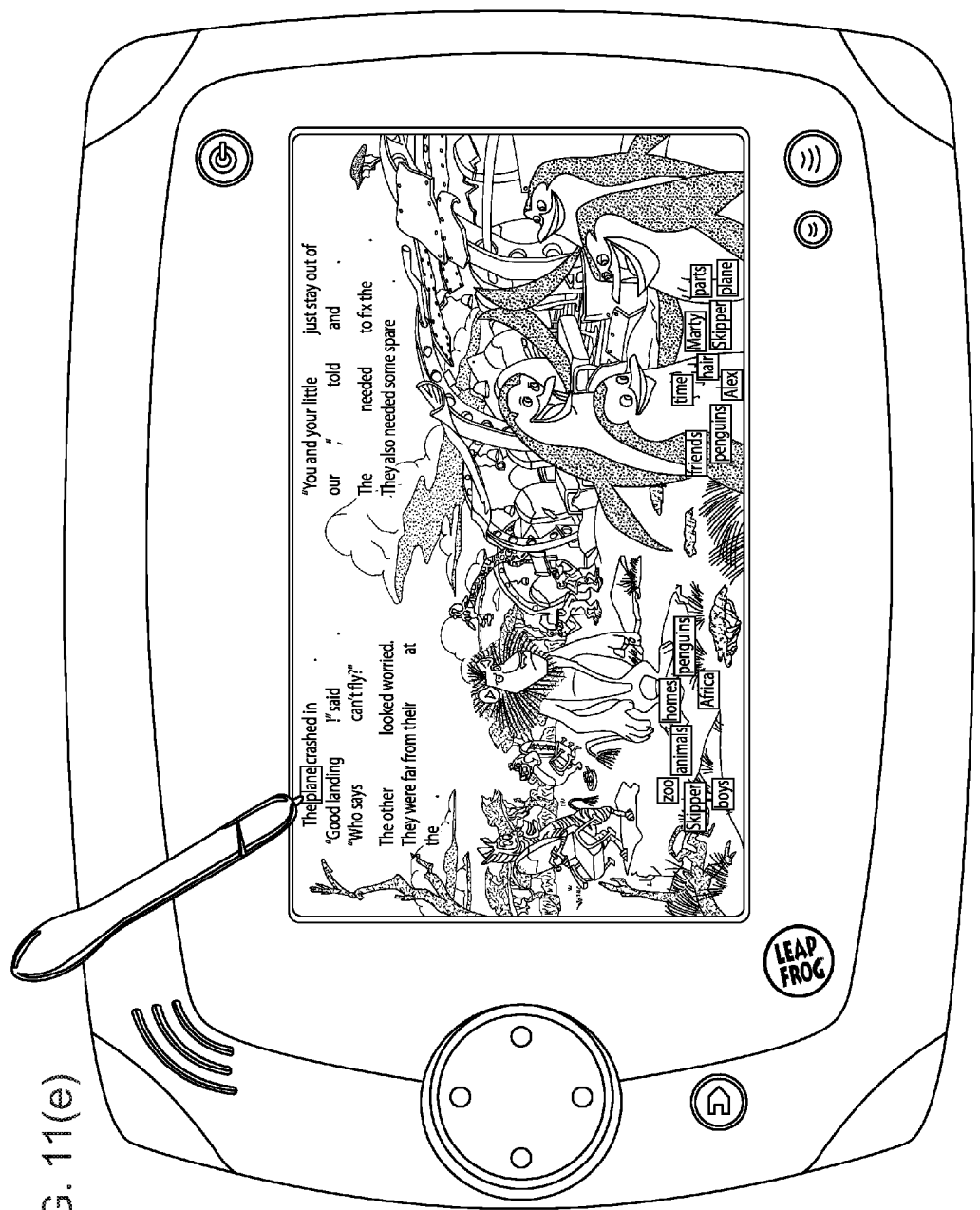

FIG. 10 shows a flow chart for determining the reading level for a user. Once the user enters the application (1002), the apparatus determines whether there is a auto-leveling data (1004). If there is no auto-leveling data, the user's grade is used to determine the reading level and a title page is displayed with the initial level indicated (1006). A setting is provided for a user to manually modify the reading level (1008). If the user does not manually modify the reading level, then the book application content associated with the initial reading level is provided to the user (1010) (e.g., via the display screen). If the user does manually modify the reading level, then the book application content associated with the reading level the user has chosen is provided to the user (1018) (e.g., via the display screen).

If there is auto-leveling data when the user enters the application, then a title page is displayed with the suggested level indicated based on the auto-leveling data (1012). A setting is provided for a user to manually modify the reading level (1014). If the user does not manually modify the reading level, then the book application content associated with the suggested reading level is provided to the user (1016) (e.g., via the display screen). If the user does manually modify the reading level, then the book application content associated with the reading level the user has chosen is provided to the user (1018) (e.g., via the display screen).

Activities

In an embodiment of the invention, each book application may have several activity instances. Activities may be closely related to the content of the book text so that the activity's difficulty level may also be raised. When text is longer and has more details, there may be more points to set questions and answers. High-level questions may be longer and may have more challenging structure and vocabulary. Activities may also be separate from or independent from a book application or related to more than one book application.

An activity may be launched by selecting an activity icon that appears onscreen. An activity may be focused on one or more curricular goals such as reading comprehension (e.g., story comprehension activity and vocabulary) and reading basics (e.g., decoding and word recognition). The activities log user data and affect the user's suggested reading level though auto-leveling functionality. Activities may only be available when the user's reading level is his suggested reading level. Activities may also be available at all reading levels and not only when the user is at his specific reading level. A user may earn rewards by completing activities. On the reader's reward page at the end of the story, an audio prompt may remind readers that to earn rewards, they can go back and play activities in the story. Each activity may have a different content that plays depending on the page and reading level. Activities may be optional.

The activities may appear at different intervals in any given book application. Each activity may be related to the story page it is found on and all of its answers may be found or may be provided on that page. There may also be an end of book decodable word activity.

There may be several types of activities where a user taps on words of graphics to answer a question. Graphics may include images as well as yes and no buttons. These types of activities may include story page questions (e.g., tap a target to answer a simple question using words or graphics on a page), spot the words (e.g., spot words read in audio on a story page and answer as much as possible before time runs out), multiple choice (e.g., pick the correct answer from all the given answers), and binary choice (e.g., hear the audio and then choose form one of two items according to the story such as true/false, yes/no, before/after, Mater/Lightning, etc.).

Other types of activities may be provided where a user may drag a word to fill in the blanks in a sentence or paragraph. These types of activities may include shaking the device so that the words fall out and then the user has to drag the words back into the correct location (e.g., choose one word from several words and drag it into a blank).

Figure 12:
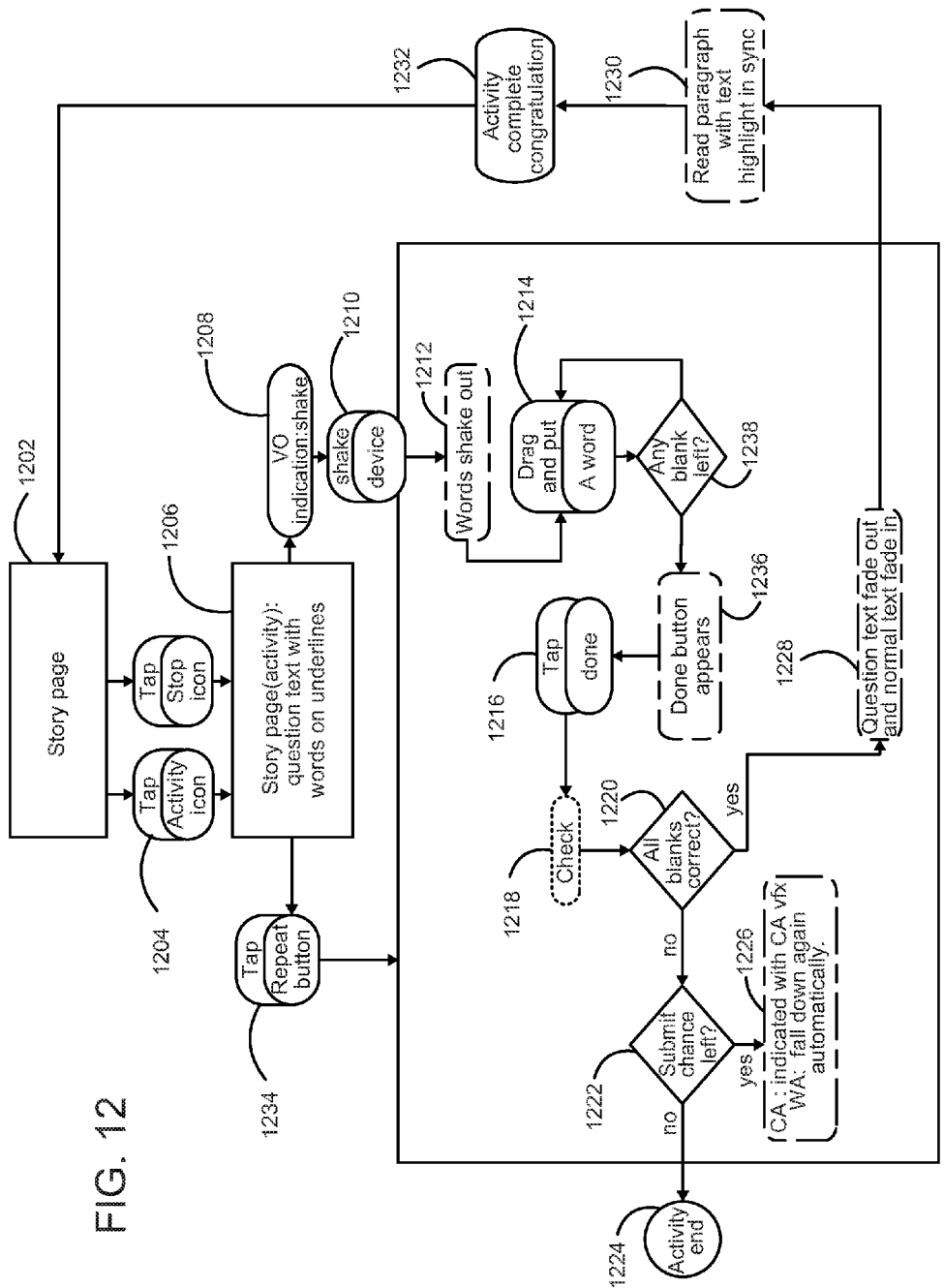
FIG. 12 is a flow chart of an exemplary activity according to an embodiment of the invention.

An exemplary motion based activity is a shake and drag activity is shown in FIGS. 11(*a*)-(*e*) and 12. Referring to FIG. 12, to access an activity, a user may press an activity button (1204) on a story page (1202). The story text may fade and the question text may fade in (1206). The text (e.g., content 1106) may comprise a plurality of stationary image elements 1102 and a plurality of removable image elements 1104 as shown in FIG. 11(*a*). There may be several words underlined or highlighted on the page as shown in FIG. 11(*a*) which comprise the removable elements 1104. Audio instructions may indicate to the user to shake the device (1208). The user may have the option of tapping a button to repeat the instructions (1234). Once the user shakes the device (1210), the highlighted words fall down from the text to the bottom of the screen on an answer bar with random order (1212), as shown in FIGS. 11(*b*)-11(*c*). A user can then drag any answer to any blank during the play phase (1214), as shown in FIGS. 11(*d*)-11(*e*). A user may then tap done to submit his answers (1216). The done button then appears (1236) and the apparatus checks if any blanks are left (1238) (e.g., determines the location of placement of the image elements). If blanks are left, the user can continue to drag and put the words in the blanks (1214).

If the user taps the done button and all the blanks are filled, the answers may then be checked (1218) (e.g., determines the location of placement of image elements and if they are placed in the correct location(s)). The answers may also be checked one at a time when the user places each answer. If all the blanks are not correct (1220) and there are no chances left (1222), then the activity may end (1224). For example, if the user fails to get all the answer correct after a certain amount of tries (e.g., 3 tries), then the activity may automatically quit. Audio may be played that says "listen to the story and try again," or "listen to this page and try again." If all the blanks are not correct (1220), and there are still more chances left (1222) a correct answer may be indicated with a visual effect and a wrong answer may automatically fall back to the answer bar (1226). The user may try to drag the falling wrong answers to its correct blanks and submit again using the done button.

If all the blanks are correct (1220), the question text may fade out and normal text may fade in (1228). After all the blanks are correctly filled, the whole paragraph may be read once (1230). After the user completes the activity, a pop-up message may appear on the display to congratulate the user (1232). In the pop-up window the user may see how many correct answers he gets in an activity.

In other embodiments, instead or in addition to shake and dragging text back into sentences as described above, other activities may include shaking and dragging numbers back into equations and shaking and dragging objects and associated words. For example, a number of equations may be displayed to the user (e.g., 1+1=2; 2+3=5; and 6+7=8) and when the user shakes the device, predetermined numbers may fall out (e.g., a 1, the 3 and the 8). Then the user may drag the numbers that fell out into the blanks in the equations (e.g., insert the 1 into the equation_+1=2). Similarly, a number of shapes or objects and associated words may be displayed to the user (e.g., drawing of a cat, drawing of a mouse, a square, a triangle, etc.). When the user shakes the device the words may fall out and the user may drag the words back next to the associate shape or object (e.g., the word "cat" next to the drawing of the cat).

Figure 15:
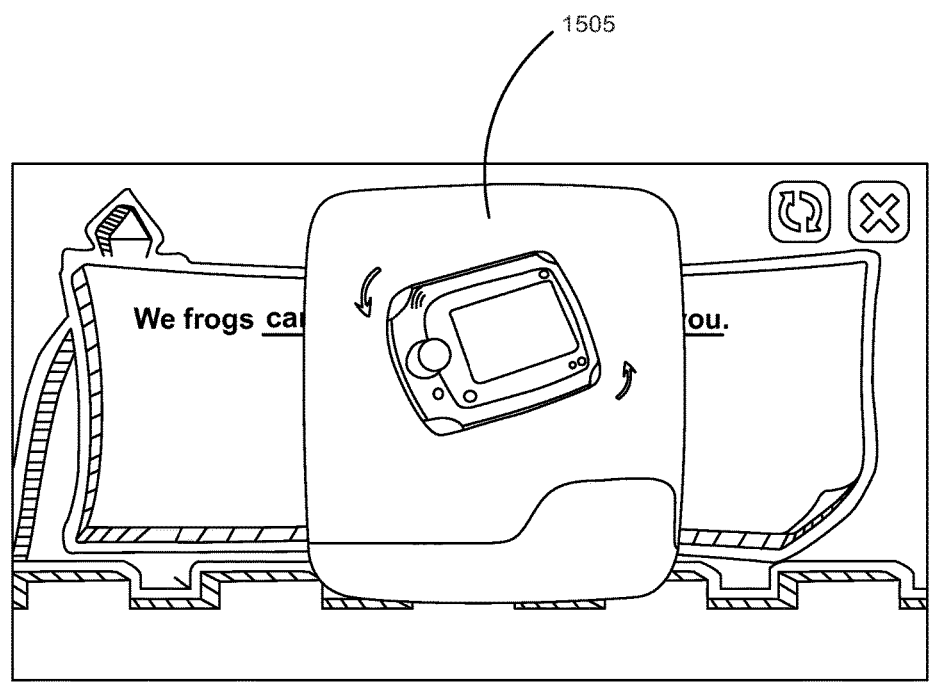

The activity may start out with just a couple or few words that are fairly obvious and then later on use words that require a user to make more inferences. For example, a reading level 1 may have 2 words for each read, reading level 2 may have 3 words for each read, level 3 may have 4 words for each read, etc. An exemplary shake and drag activity with just a few words is shown in FIGS. 15-20. The few words may be predetermined based on a reading level, curriculum needs, etc. or may be random. As explained in further detail above, instructions may indicate to a user to shake the device. In FIG. 15, a visual indication 1505 is used to indicate to a user to shake the device. The visual indication may be accompanied by audio instructions.

Figure 16:
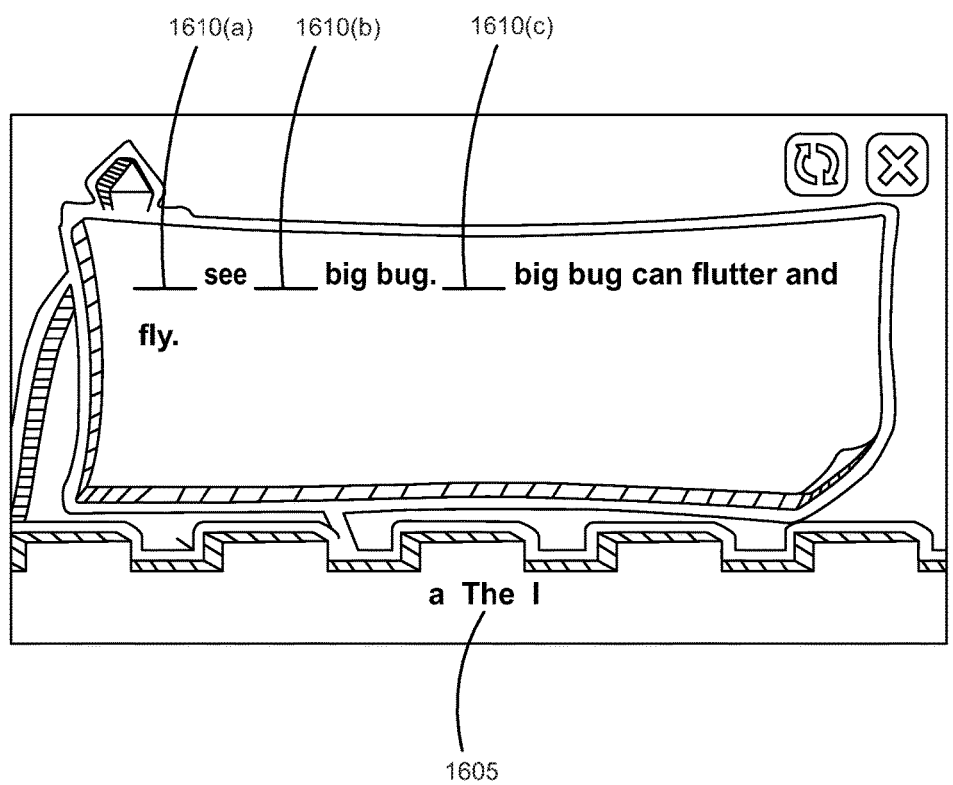
Figure 17:
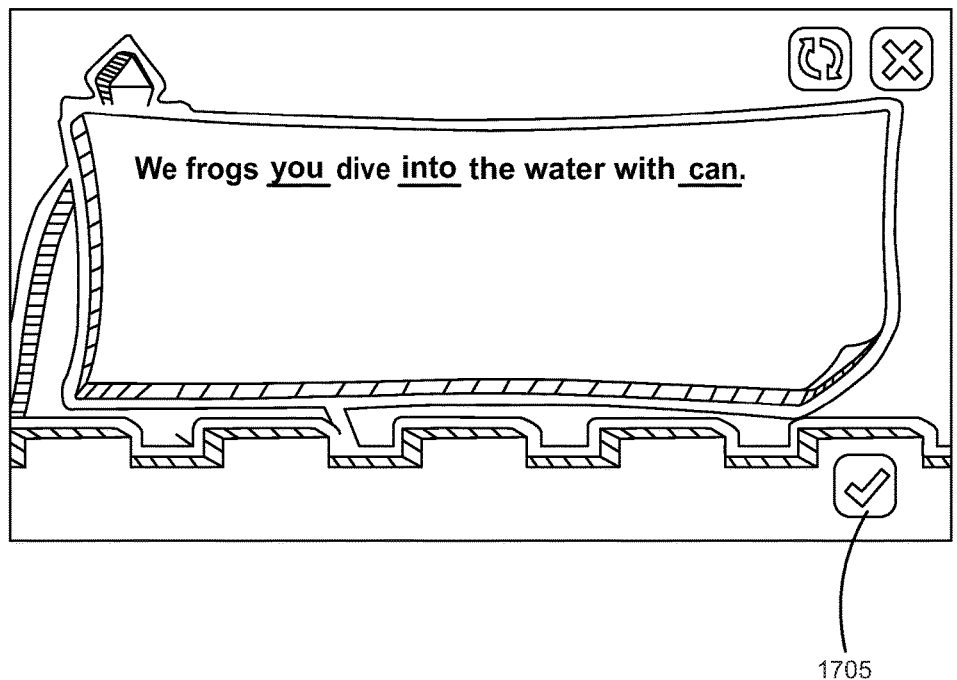
Figure 18:
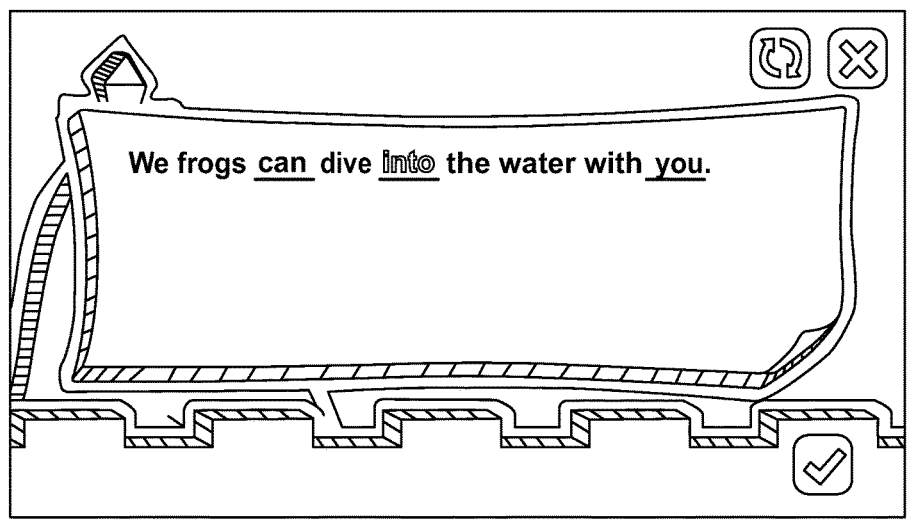
Figure 19:
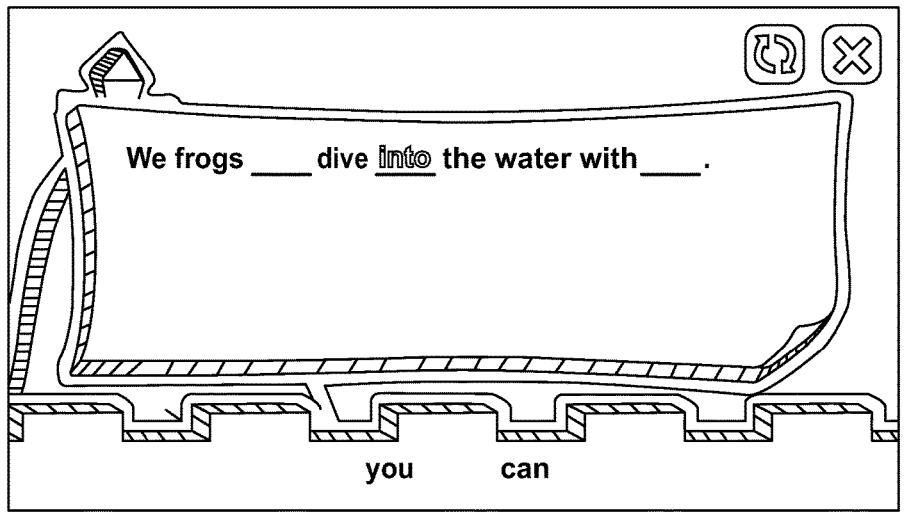
Figure 20:
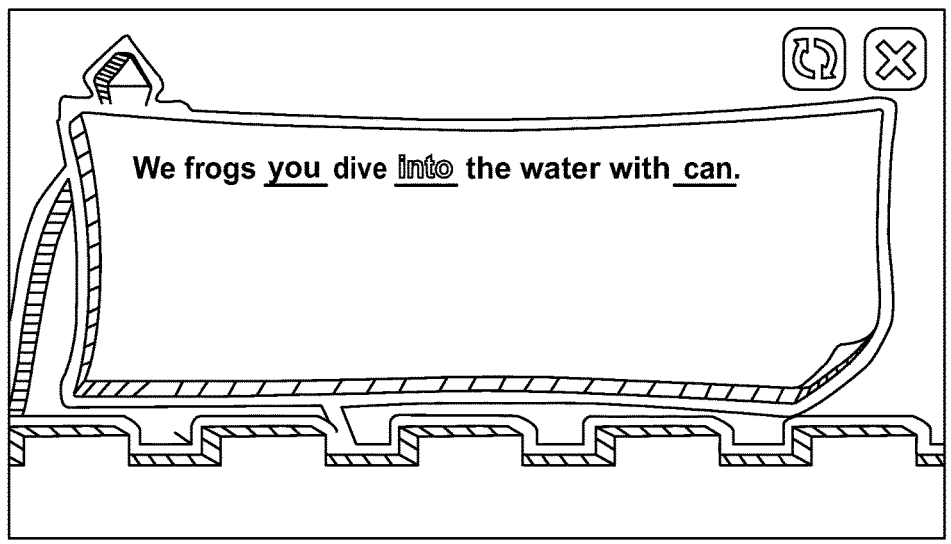

Once the user shakes the device, the underlined words 1605 fall down from the text to the bottom of the screen in random order as shown in FIG. 16, and blanks 1610(*a*)-(*c*) appear in the sentence where the words fell from. The user can then drag any answer to any blank as shown in FIG. 17. A done button 1705 may then appear that the user can use to indicate that he is done and ready to submit his answers. The user may tap the done button to submit his answers. The apparatus checks if any blanks are left (e.g., determines the location of placement of the image elements). If no blanks are left as shown in FIG. 17, the answers may then be checked (e.g., determines the location of placement of image elements and if they are placed in the correction location(s)). If all the blanks are not correct, a correct answer may be indicated with a visual effect (e.g., correct answers in green, wrong answers in red) as shown in FIG. 18 and a wrong answer(s) may automatically fall back down to the bottom of the screen as shown in FIG. 19.

The user may try to drag the fallen wrong answer(s) to the correct blanks again (FIG. 20) and continue the process until the user gets them all correct or until an automatic cutoff for number of tries, as explained in further detail above.

Figure 21:
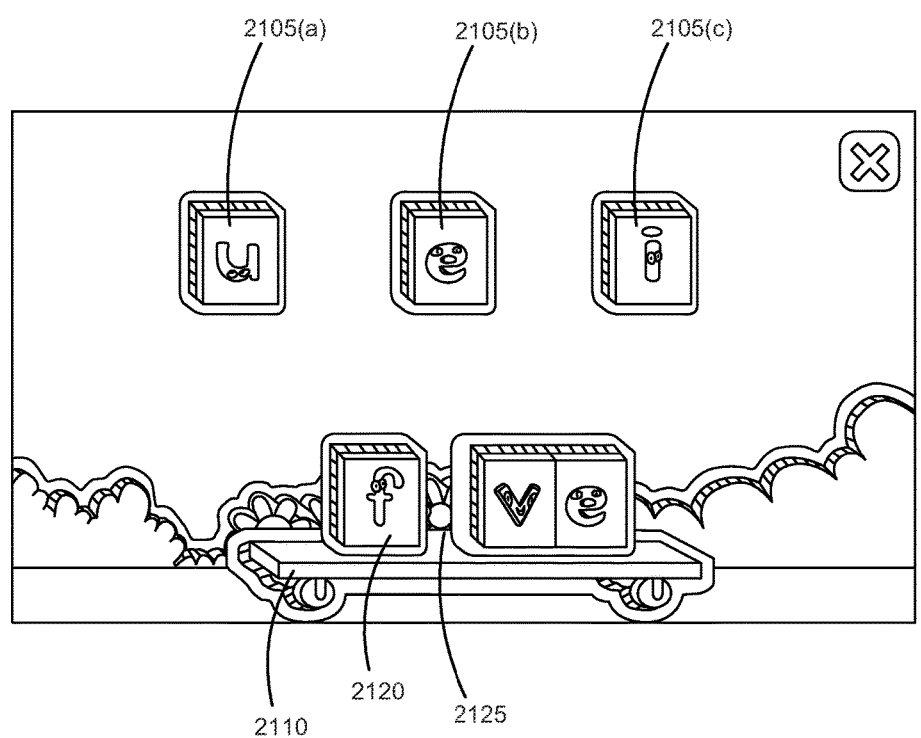
Figure 22:
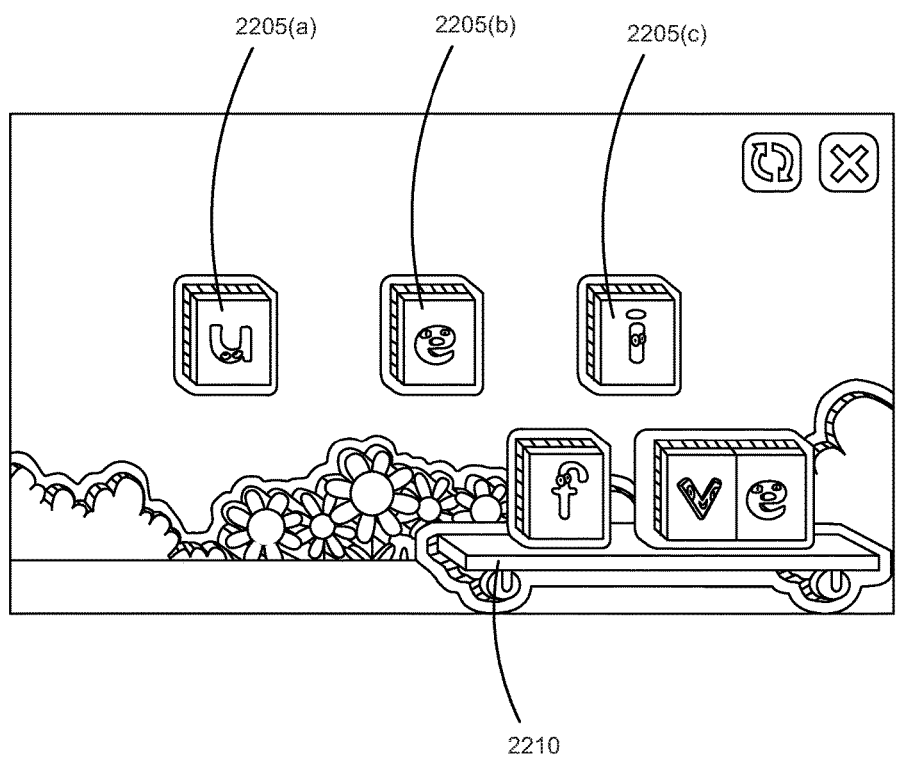
Figure 23:
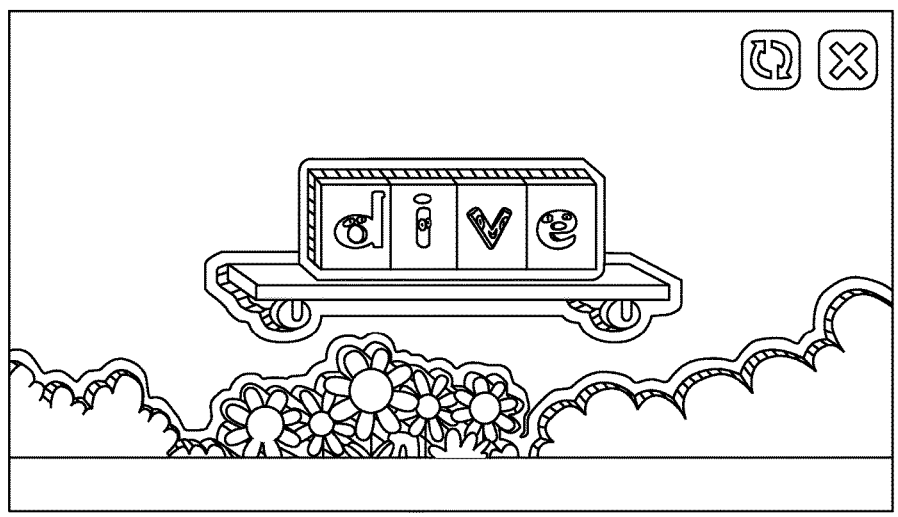

Another exemplary motion based activity is a catch the falling words activity shown in FIGS. 21-23. As shown in FIG. 21 there may be letters 2105(*a*)-(*c*) that are falling down from the top of the screen and a cart 2110 at the bottom of the screen containing a word 2120 with a space for one or more missing letters 2125. As the letters are falling down from the top of the screen, the user has to tilt the device to move the cart 2110 under the correct letter to catch the letter in the right position to complete the word on the cart (e.g., tilting the device to the left moves the cart 2110 to the left, tilting the device to the right moves the cart 2110 to the right). For example, a user may tilt the device to the right so that the cart 2210 rolls to the right of the screen to be positioned underneath the falling letter "i" 2205(*c*) so that it will fall between the letters "f" and "v" as shown in FIG. 22. Once the letter falls into place, the word is checked for the correct answer. If the answer is correct, a visual indication that the word is correct may be shown to the user, as shown in FIG. 23. If the answer is not correct, the user may be given the opportunity to try again or to try another word.

Figure 24:
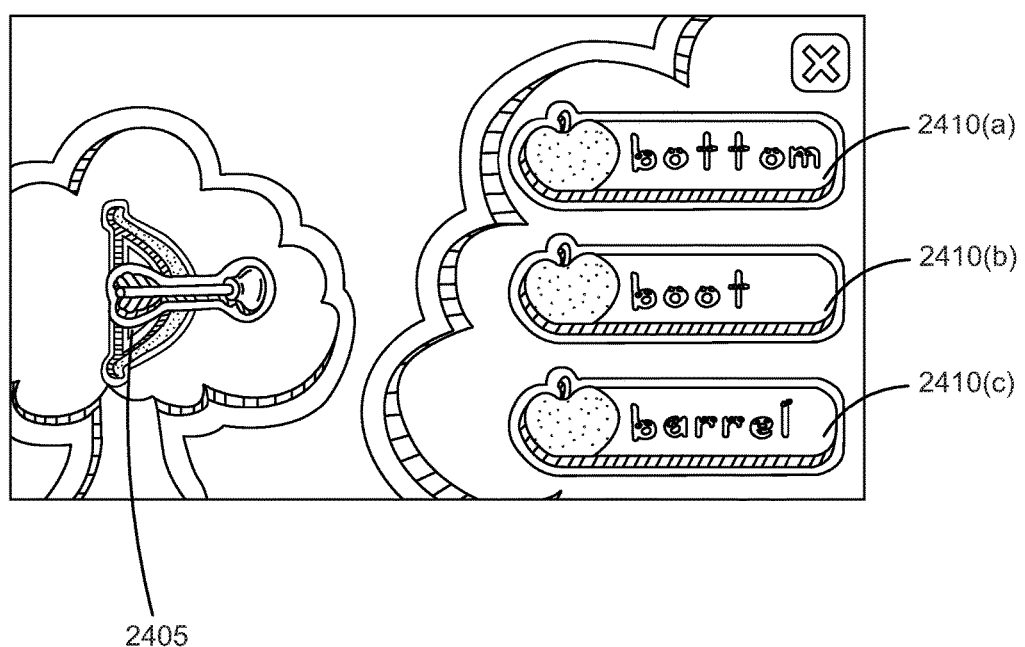
Figure 25:
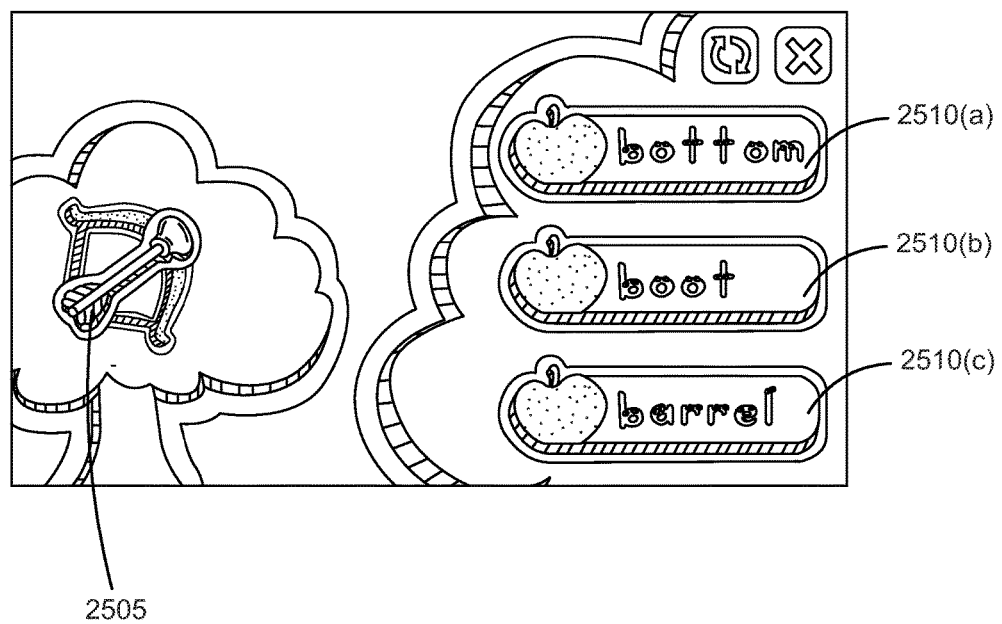
Figure 26:
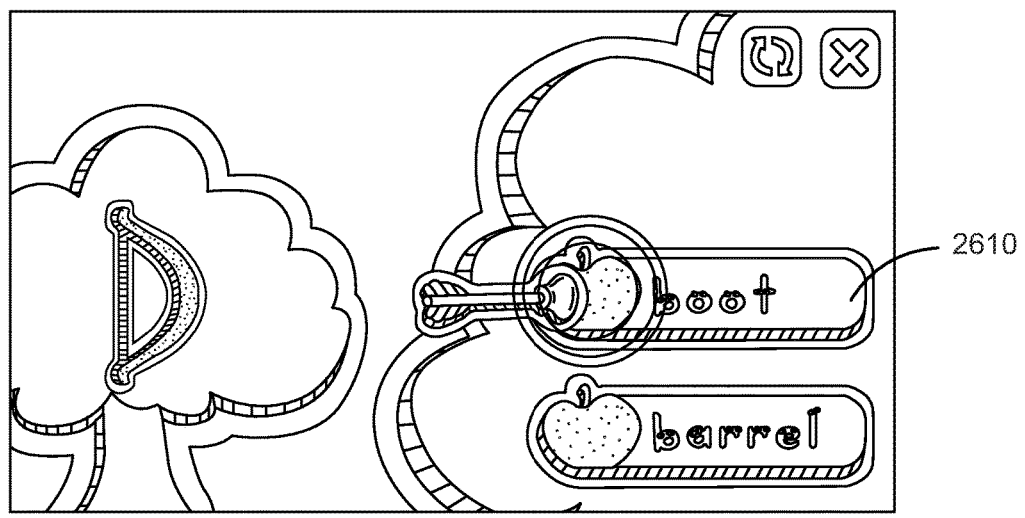

Another exemplary activity is a marksmen activity shown in FIGS. 24-26 where a user may pull back an arrow and release it to shoot it into the target for the correct word. FIG. 24 shows an arrow 2405 and word targets 2410(*a*)-(*c*). For example, a user may be asked a question or given a sentence to complete. To answer the question or complete the sentence, as shown in FIG. 25, the user may touch the arrow 2505 and drag it back and point it in the direction of the word target 2510(*a*)-(*c*) that he wants to select. He would then release his touch on the arrow to shoot it at the word target. The arrow would proceed in the direction of the word target 2610 as shown in FIG. 26. Once the arrow has reached the word target 2610, the word is checked for the correct answer. If the answer is correct, a visual or audio indication that the word is correct may be shown to the user. If the answer is not correct, the user may be given the opportunity to try again or to be given another question or sentence to complete.

Figure 27:
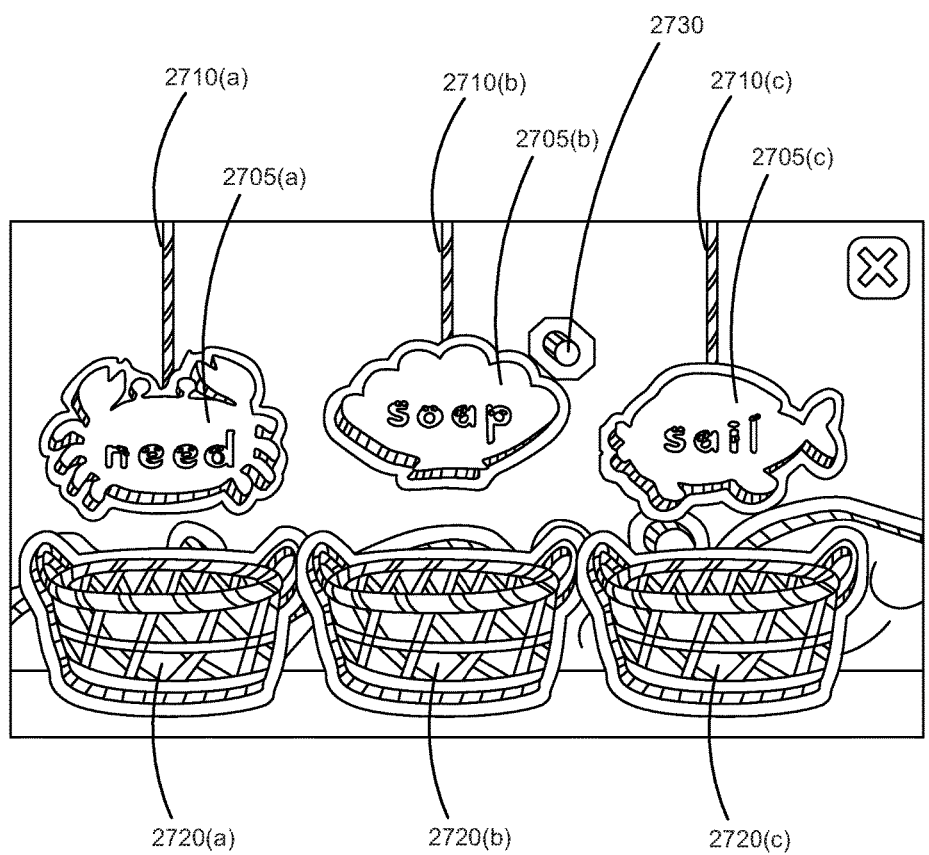
Figure 28:
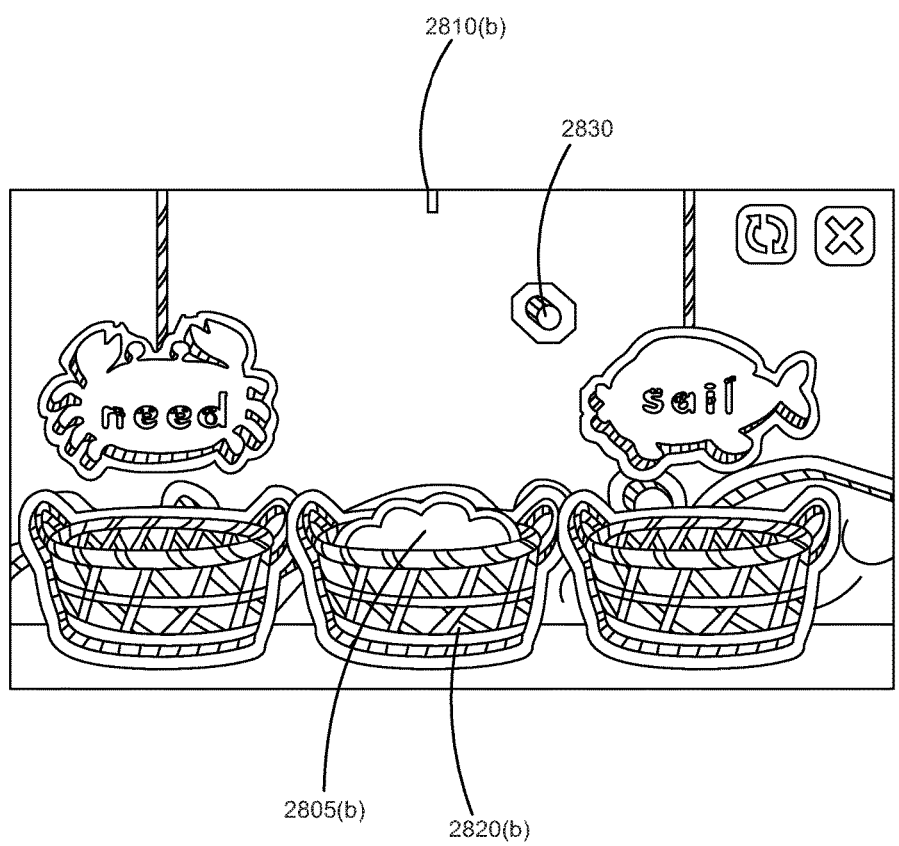

Another exemplary activity is a cut the rope activity shown in FIGS. 27-28. A user may be asked a question or given a sentence to complete. As shown in FIG. 27 words 2705(*a*)-(*c*) may appear hanging on ropes 2710(*a*)-(*c*) over baskets 2720(*a*)-(*c*). A user may touch and drag a tool 2730 to cut the rope of the word he selects as the answer. As shown in FIG. 28, the user uses the tool 2830 to cut the rope 2810(*b*) and then the word 2805(*b*) that was hanging from the rope 2810(*b*) falls into the basket 2820(*b*) underneath the word 2805(*b*). The answer is then checked if it is correct. If the answer is correct, a visual or audio indication that the word is correct may be shown to the user. If the answer is not correct, the user may be given the opportunity to try again or to try question or sentence to complete.

The results of the activities performed by the user may determine what reading level should be set for the user. For example, if the user does a certain amount of activities (e.g., 6) at least once and answers a certain percentage of questions correctly at the first attempt (e.g., 75%), he may be leveled up. If the user answers a certain percentage of questions incorrectly (e.g., 50%), he may be leveled down. Each question and answer may be logged to the user's profile. Each level up and each level down event may also be logged to the user's profile. The questions are logged so that a duplicate assessment is not made for a repeated question.

There may be a predetermined number of questions for each reading level (e.g., 90 questions per reading level), with a certain number of questions organized across different activities.

RELATED APPLICATIONS

Figure 13:
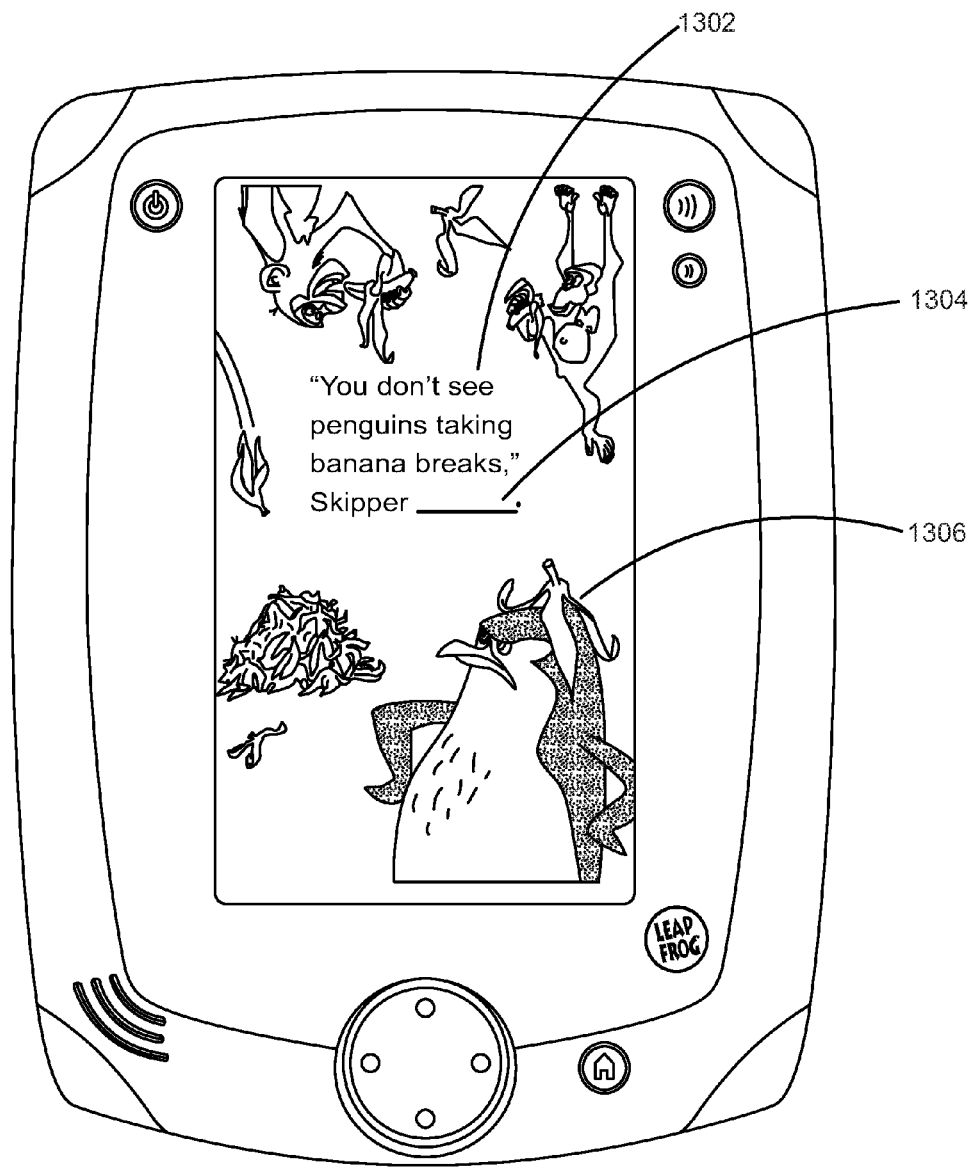
FIGS. 13-28 are exemplary screen shots of a display of a table learning apparatus according to embodiments of the invention.
Figure 14:
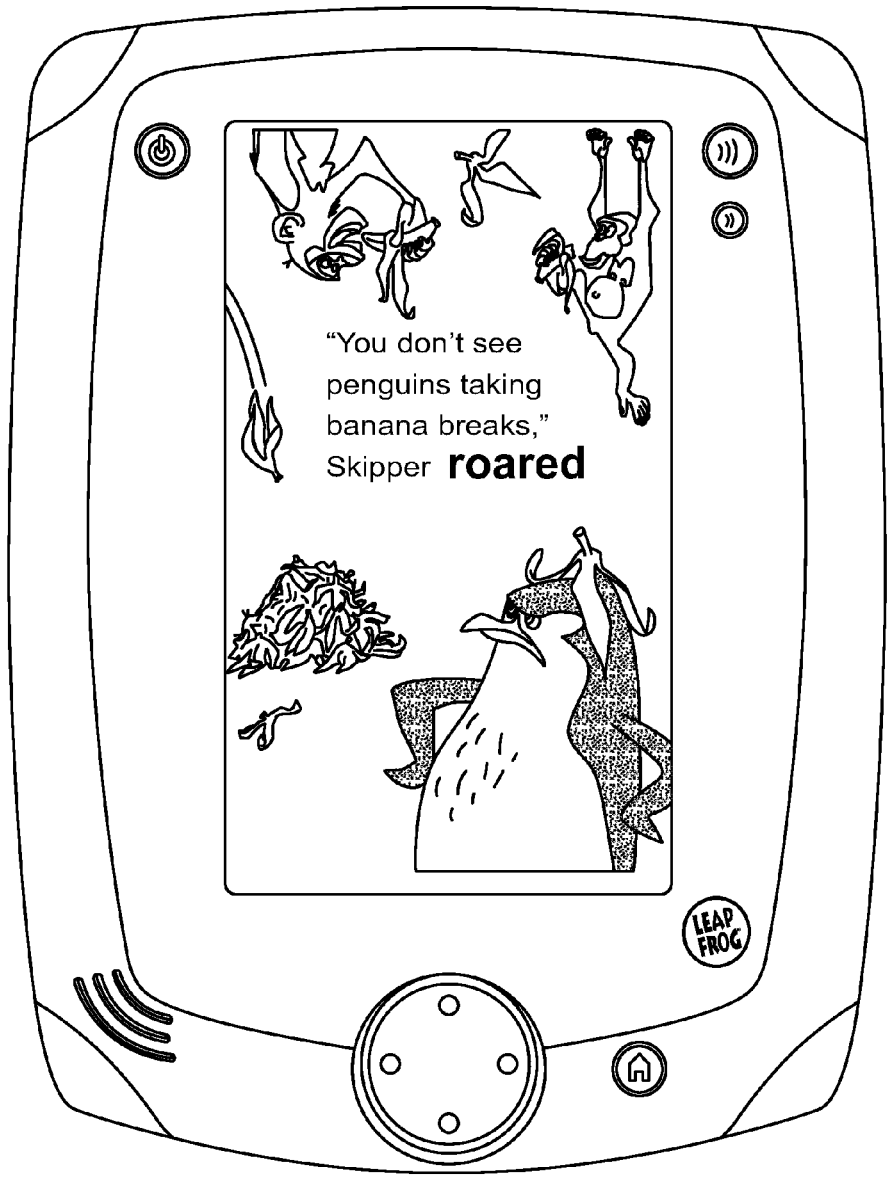

In embodiments of the invention, dynamic audio and visuals may be available to the user as shown in FIGS. 13-14. The audio or visuals may change based on a user's choice. For example, content may be displayed to a user and a user may choose to fill in a blank (e.g., data input region 1304) in the sentence (e.g., words 1302) as shown in FIG. 13. The user may choose or type in the word "roared" to complete the sentence as shown in FIG. 14. For example, the user may choose from a drop down menu of words to select or a user may be given audio choices and then type in the word or a user may drag words from another part of the page, etc. Once the input from the user is received, the audio for the page may then read the sentence with the word the user has typed or selected. The graphics may also change to reflect the word selected (e.g., the appearance of object 1306 may be modified). For example, the penguin (e.g., object 1306) may look angry if the word "roared" is selected and the penguin may look timid if the word "whispered" is selected. In this way, a user may design his own story. The story could be multiple pages with options to choose different words throughout the story and for the audio and visuals to change based on a user's choice. After a user makes his choice, the animation and/or audio associated with the choice may be played for the user (e.g., a narrator may read back the sentence, paragraph, or page).

The apparatus may contain numerous other features and applications. For example, games may be provided to immerse the user in the story and enable him to participate in an action within the world of the story. Games may act as a story transition experience. Games may be triggered automatically when the user turns to certain pages. There may be a number of games associated with each book (e.g., mini-games about 30 seconds each).

A visual dictionary and glossary may also be provided. For example a special overlay screen may appear for some words. When the user taps on the word, the he may hear a child-friendly explanation of the word (e.g., "When someone is upset, they are unhappy"). Animations may be played to show the scene/context in which the word is used (e.g., Zen Master gently rakes for 3 seconds. Mater drives past Zen Master and hits glass with hook. Zen Master looks upset.). A line of on-screen text may appear with a new sentence with the learned word (e.g., Mater upset a Zen Master).

A picture-word match may be provided. A user may tap a word in the story text, and its corresponding character/object may react. Also, a user may tap a character/object in the illustration of the story page, and the corresponding word in the story text may highlight.

An achievements page may also be provided where a user will be awarded for curricular and game achievements and explorations. Unique art may be unlocked in a Rewards Page to motivate the user to complete his collection and earn all achievements.

Although certain programs and applications are described in detail above, it is understood that embodiments of the invention are not limited thereto. The educational programs, games and applications may relate to any suitable subject including: math (addition, subtraction, division, multiplication); spelling; number, letter, or shape recognition; phonics; drawing; writing; coloring; fun facts; history; and pattern matching, etc.

There are many advantages provided by embodiments of the invention. For example, embodiments of the invention allow a user to achieve higher levels of reading in addition to supporting the user and his current reading level. Providing a story at several different levels gives readers the opportunity to read a story at a level that more closely matches their reading still, In addition, it enables readers to explore higher levels of text by listening to words and stories read aloud. Listening to higher level vocabulary is an important part of developing reading skills, and gradually increasing text difficulty in book applications is crucial for early reading instruction. Further, providing interactive reading and related learning activities can lead to a higher reading achievement by further engaging readers and building confidence in reading.

Reading modes and levels provide a wide range of possible difficulty level for kids of different grades and reading abilities. This builds reading skill and reading comprehension to help users learn to read. Different profiles/users may have a different book experience and level with the same application. Further, since several version of each story are included in one application, there is more value for the price. Enticing pages and fun activities, mini-games, and recordings all encourage kids to read. Activities give kids the chance to learn reading skills, and mini-games give kids the chance to immerse themselves into the stories. Motion based activities further provide the advantages of hand-eye coordination and related motor skills. Recording gives kids the opportunity to record their own readings of the books.

The term "content" used throughout this application may include sentences, pictures, stories, math problems, narratives, blogs, drawings, recordings, video, animations, images, words, etc.

It should be understood that the present invention as described above can be implemented using software, hardware, or a combination of both, in the form of control logic. Based on the disclosure and teachings provided herein, a person of ordinary skill in the art will know of the appropriate ways and/or methods to implement the present invention.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

While the foregoing is directed to certain embodiments of the present invention, other and further embodiments of the invention may be devised without departing from the basic scope of the invention. Such alternative embodiments are intended to be included within the scope of the present invention. Moreover, the features of one or more embodiments of the invention may be combined with one or more features of other embodiments of the invention without departing from the scope of the invention.

Different programs may be obtained from other stand-alone memory devices such as data cartridges. In other embodiments, it is possible to download new programs from a server computer via a communication medium such as the Internet.

What is claimed is:

1. An apparatus comprising:
   a housing;
   a display screen on the housing;
   a processor coupled with the housing; and
   a non-transitory computer readable medium coupled to the processor, the non-transitory computer readable medium comprising computer readable program code embodied therein, the computer readable program code adapted to be executed by the processor for implementing operations including:
   determining a number of a plurality of removable words within at least one sentence to provide on the display screen based on a reading level of a user;
   electronically providing the at least one sentence to the user via the display screen, the at least one sentence comprising a plurality of stationary words and the plurality of removable words based on the reading level of the user;
   electronically providing instruction to the user to shake the apparatus;
   detecting when the user shakes the apparatus, the user shaking causing the removable words to be moved from their corresponding original location within the at least one sentence to one or more locations on the display away from the at least one sentence;
   moving the removable words from within the at least one sentence to the one or more locations on the display away from the at least one sentence in response to the user shaking the apparatus, and displaying the removable words in a random order;
   receiving an indication that one or more of the removable words has been selected by the user and moved to a location in the at least one sentence;
   determining the location of the one or more removable words; and
   determining whether the location of the one or more removable words is a correct placement or an incorrect placement based on whether the one or more removable words have been moved back to the corresponding original location from the one or more locations on the display away from the at least one sentence.

2. The apparatus of claim 1, wherein the operations further include:
   electronically providing feedback to the user regarding the location of the one or more removable words moved by the user.

3. The apparatus of claim 1, wherein the operations further include:

based on the determination that the location of one or more removable words is an incorrect placement, causing the one or more removable image elements that is in an incorrect placement to move away from the location in the at least one sentence.

4. The apparatus of claim 1, wherein the operations further include:
determining a reading level of the user before determining the number of the plurality of removable words within the at least one sentence to provide on the display screen.

5. The apparatus of claim 1, wherein the operations further include:
determining a reading level to be set for the user, based on a determination that the location of the one or more removable words is a correct placement.

6. The apparatus of claim 1, wherein the operations further include:
logging user data related to the location in the at least one sentence of the one or more removable words moved by the user.

7. The apparatus of claim 6, wherein the operations further include:
determining a reading level based on the logged user data.

8. The apparatus of claim 1, wherein the operations further include:
determining that the location of the one or more removable words is not a correct location in the at least one sentence;
determining that there are no chances left for the user to move the one or more removable words to a correct location in the at least one sentence; and
automatically quitting an activity associated with the at least one sentence.

9. The apparatus of claim 1, wherein the operations further include:
determining that the location of the one or more removable words is not a correct location in the at least one sentence;
determining that there are more chances left for the user to move the one or more removable words to a correct location in the at least one sentence; and
moving the one or more removable words that are not in a correct location in the at least one sentence, to one or more locations on the display away from the at least one sentence.

10. The apparatus of claim 1, wherein the operations further include:
providing content in an electronic book via the display screen to the user, wherein the content includes multiple pages each having at least an image of an object, words, and a data input region;
for each of the multiple pages:
receiving input of a word from the user into the data input region; and
automatically modifying, by the processor, an appearance of the object in response to the input of the word from the user, the appearance of the object reflecting the meaning of the word inputted from the user after receiving the input from the user;
forming a story based on the multiple pages; and
playing back the story for the user.

11. The apparatus of claim 10, wherein the object is an image of a character in a story.

12. The apparatus of claim 11, wherein modifying the appearance of the object includes modifying an expression of the character in the story.

13. The apparatus of claim 11, wherein the operations further include:
playing audio associated with the input from the user.

14. The apparatus of claim 10, wherein the operations further include:
providing a plurality of words for the user to choose to input into the data input region.

15. The apparatus of claim 14, wherein the appearance of the object depends upon the which word the user chooses to input into the data input region.

* * * * *